United States Patent
Zhu

(10) Patent No.: US 12,425,245 B2
(45) Date of Patent: Sep. 23, 2025

(54) BLOCKCHAIN-BASED DATA PROCESSING METHOD, APPARATUS AND DEVICE, AND STORAGE MEDIUM

(71) Applicant: TENCENT TECHNOLOGY (SHENZHEN) COMPANY LIMITED, Shenzhen (CN)

(72) Inventor: Gengliang Zhu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 225 days.

(21) Appl. No.: 18/323,120

(22) Filed: May 24, 2023

(65) Prior Publication Data

US 2023/0299984 A1    Sep. 21, 2023

Related U.S. Application Data

(63) Continuation of application No. PCT/CN2022/108482, filed on Jul. 28, 2022.

(30) Foreign Application Priority Data

Aug. 18, 2021    (CN) .......................... 202110948504.6

(51) Int. Cl.
*G06Q 30/06* (2023.01)
*H04L 9/00* (2022.01)

(52) U.S. Cl.
CPC .................................... *H04L 9/50* (2022.05)

(58) Field of Classification Search
None
See application file for complete search history.

(56) References Cited

U.S. PATENT DOCUMENTS

| | | | |
|---|---|---|---|
| 2019/0340266 A1 | 11/2019 | Vo et al. | |
| 2023/0299984 A1 | 9/2023 | Zhu | |

FOREIGN PATENT DOCUMENTS

| | | | | |
|---|---|---|---|---|
| CN | 112364020 A | * | 2/2021 | ......... G06F 16/2255 |
| CN | 112446771 A | * | 3/2021 | ............ G06F 21/64 |
| CN | 112948153 A | | 6/2021 | |
| CN | 113065775 A | * | 7/2021 | |
| CN | 113067897 A | * | 7/2021 | |
| CN | 113098694 A | | 7/2021 | |
| CN | 113256424 A | | 8/2021 | |
| CN | 113395363 A | | 9/2021 | |

OTHER PUBLICATIONS

The World Intellectual Property Organization (Wipo) International Search Report and Written Opinion for PCT/CN2022/108482 Sep. 29, 2022 7 Pages (including translation).

* cited by examiner

*Primary Examiner* — Christopher B Robinson

(74) *Attorney, Agent, or Firm* — ANOVA LAW GROUP, PLLC

(57) ABSTRACT

A blockchain-based data processing method includes: obtaining on-chaining indication information of the blockchain, the on-chaining indication information indicating a type of a next block to be on-chained; obtaining a target block waiting for consensus in a blockchain network, the target block being generated according to cross-chain service data; and adding the target block to the blockchain as the next block in response to that the on-chaining indication information indicates that the next block is of a coexclusive type, where a block of the coexclusive type is configured to store data of an independent cross-chain service.

18 Claims, 6 Drawing Sheets

BLOCKCHAIN-BASED DATA PROCESSING METHOD, APPARATUS AND DEVICE, AND STORAGE MEDIUM

CROSS-REFERENCES TO RELATED APPLICATIONS

This application is a continuation application of PCT Patent Application No. PCT/CN2022/108482, entitled "BLOCKCHAIN-BASED DATA PROCESSING METHOD, APPARATUS AND DEVICE, AND STORAGE MEDIUM" and filed on Jul. 28, 2022, which claims priority to Chinese Patent Application No. 202110948504.6, filed with the Chinese Patent Office on Aug. 18, 2021 and entitled "BLOCKCHAIN-BASED DATA PROCESSING METHOD, APPARATUS AND DEVICE, AND STORAGE MEDIUM", the entire contents of both of which are incorporated herein by reference.

FIELD OF THE TECHNOLOGY

The present disclosure relates to the field of computer technology, and specifically relates to a blockchain-based data processing method, a blockchain-based data processing apparatus, a blockchain-based data processing device, a computer-readable storage medium and a blockchain-based data computer program product.

BACKGROUND OF THE DISCLOSURE

With continuous development of computer technology, blockchain is widely used in asset transfer, service data storage, and the like due to its traceable characteristics. Take service data storage as an example. After a blockchain node generates service data, the service data is pushed onto ensure that the service data is traceable (that is, the service data cannot be tampered with after being uploaded). In practical applications, when service data is uploaded, the service data requested to be uploaded within a time period is usually packed into a block. It is found that because a cross-chain service may be related to multiple service data, the efficiency of processing cross-chain service is low.

SUMMARY

According to embodiments of the present disclosure, a blockchain-based data processing method, apparatus and device, a storage medium and a computer program product are provided.

On the one hand, an embodiment of the present disclosure provides a data processing method based on a blockchain, where the blockchain contains at least one block and is located in a blockchain network including a witness subnet and a consensus subnet. The witness subnet contains at least one service node, and the consensus subnet contains at least two consensus clusters; a consensus cluster includes multiple accounting nodes, and in the consensus cluster, one accounting node is elected in its own consensus cluster as a representative node; and representative nodes of the at least two consensus clusters form a consensus committee of the blockchain. The method is implemented by a first representative node of the representative nodes in the consensus committee. The data processing method is implemented by a computer device corresponding to the first representative node, and includes: obtaining on-chaining indication information of the blockchain, the on-chaining indication information indicating a type of a next block to be on-chained; obtaining a target block waiting for consensus in a blockchain network, the target block being generated according to cross-chain service data; and adding the target block to the blockchain as the next block in response to that the on-chaining indication information indicates that the next block is of a coexclusive type, where a block of the coexclusive type is configured to store data of an independent cross-chain service.

On the other hand, an embodiment of the present disclosure provides a data processing apparatus based on a blockchain, where the blockchain contains at least one block; the blockchain is located in a blockchain network including a witness subnet and a consensus subnet, the witness subnet contains at least one service node, and the consensus subnet contains at least two consensus clusters; a consensus cluster includes multiple accounting nodes, and in a consensus cluster, one accounting node is elected in its own consensus cluster as a representative node; and the representative nodes of the at least two consensus clusters form a consensus committee of the blockchain. The data processing apparatus may be carried in a first representative node of the representative nodes in the consensus committee. The data processing apparatus includes: an obtaining unit, configured to obtain on-chaining indication information of a blockchain, the on-chaining indication information indicating a type of a next block to be on-chained, and obtain a target block waiting for consensus in a blockchain network, the target block being generated according to cross-chain service data; and a processing unit, configured to add the target block to the blockchain as the next block in response to that the on-chaining indication information indicates that the next block is of a coexclusive type, where a block of the coexclusive type is configured to store data of an independent cross-chain service.

Accordingly, the present disclosure provides a blockchain-based data processing device, including: one or more processors, configured to load and execute computer-readable instructions; and a computer-readable storage medium having stored therein computer readable instructions that, when executed by a processor, implement the blockchain-based data processing method described above.

Accordingly, the present disclosure provides a non-transitory computer-readable storage medium having stored therein computer-readable instructions, and the computer-readable instructions are stored on the computer-readable storage medium and are to be loaded by at least one processor of a first representative node and execute the blockchain-based data processing method described above.

Details of one or more embodiments of the present disclosure are provided in the accompanying drawings and descriptions below. Other features, objectives, and advantages of the present disclosure become apparent from the description, drawings and claims.

BRIEF DESCRIPTION OF THE DRAWINGS

To describe the technical solutions in this embodiment of the present disclosure or the related art more clearly, the following briefly introduces the accompanying drawings for describing this embodiment or the related art. Apparently, the accompanying drawings in the following description illustrate merely some embodiments of the present disclosure, and a person of ordinary skill in the art may derive other drawings from the accompanying drawings without creative efforts.

DESCRIPTION OF EMBODIMENTS

The technical solutions in this embodiment of the present disclosure are clearly and completely described in the following with reference to the accompanying drawings in this embodiment of the present disclosure. Apparently, the described embodiments are merely some rather than all of this embodiment of the present disclosure. All other embodiments obtained by a person of ordinary skill in the art based on this embodiment of the present disclosure without making creative efforts shall fall within the protection scope of the present disclosure.

This embodiment of the present disclosure involves blockchain technology. The following is a brief introduction to the relevant terms and concepts of blockchain technology: Blockchain is a new application mode of distributed data storage, point-to-point transmission, consensus mechanism, encryption algorithm and other computer technologies. In essence, blockchain is a decentralized database, and a series of data blocks generated by cryptography methods. Each data block contains information of a batch of network transaction, and is used for checking the validity of the information (anti-counterfeiting) and generate the next block. The blockchain may include an underlying platform of the blockchain, a platform product service layer and an application service layer.

Figure 1A:
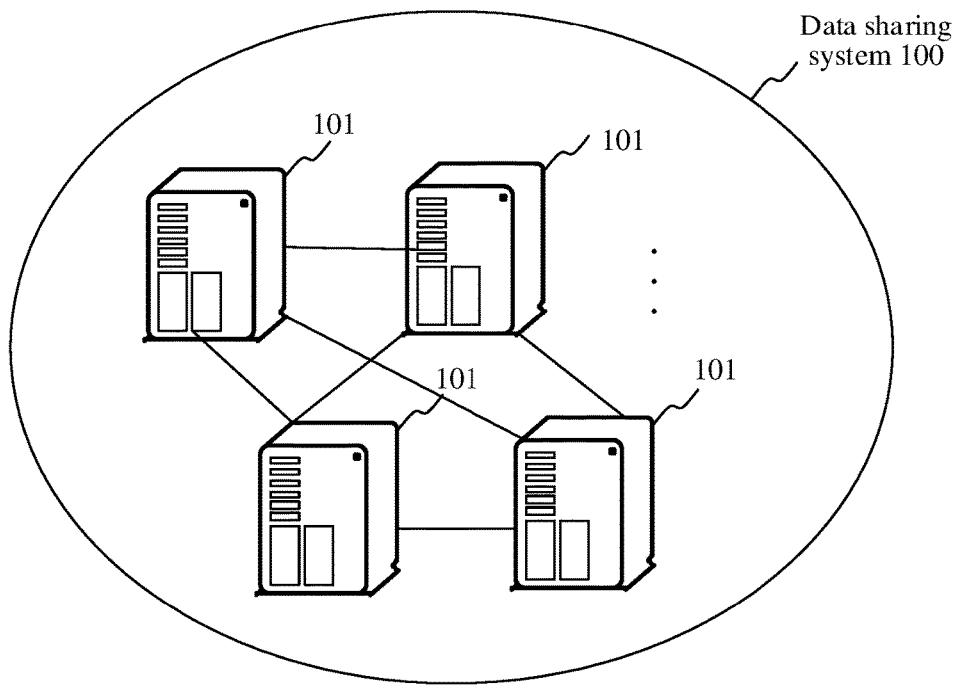
FIG. 1a shows an architecture diagram of a data sharing system provided by an exemplary embodiment of the present disclosure.

A blockchain network may be understood as a data sharing system 100. The data sharing system 100 may be used for data sharing between nodes. An exemplary structure of the data sharing system 100 is shown in FIG. 1a. As shown in FIG. 1a, the data sharing system 100 refers to a system for data sharing between nodes. The data sharing system may include multiple nodes 101, and the multiple nodes 101 may be various clients in the data sharing system.

Each node 101 may receive input information during normal operation, and maintain the shared data in the data sharing system based on the received input information. To ensure information intercommunication in the data sharing system, there can be information connections between the nodes in the data sharing system, and information transmission may be carried out between the nodes through the information connections. For example, in response to that any node in the data sharing system receives input information, other nodes in the data sharing system obtain the input information according to a consensus algorithm, and store the input information as data in the shared data, so that the data stored on all nodes in the data sharing system are consistent.

Each node in the data sharing system has a corresponding node identifier, and each node in the data sharing system may store the node identifiers of other nodes in the data sharing system, so as to broadcast information to the other nodes in the data sharing system according to the node identifiers of the other nodes. Each node may maintain a node identifier list as shown in the following table, and correspondingly store node names and node identifiers in the node identifier list. A node identifier may be an Internet Protocol (IP) address or any other information that may be used for identifying the node. For example, the identifier of a node may also be a binary sequence code (e.g., 110001110). In Table 1, only IP addresses are used for illustration as an example:

TABLE 1

| Node name | Node identifier |
|---|---|
| Node 1 | 117.114.151.174 |
| Node 2 | 117.116.189.145 |
| ... | ... |
| NodeX (X is a positive integer) | XX.XXX.XXX.XXX |

Figure 1B:
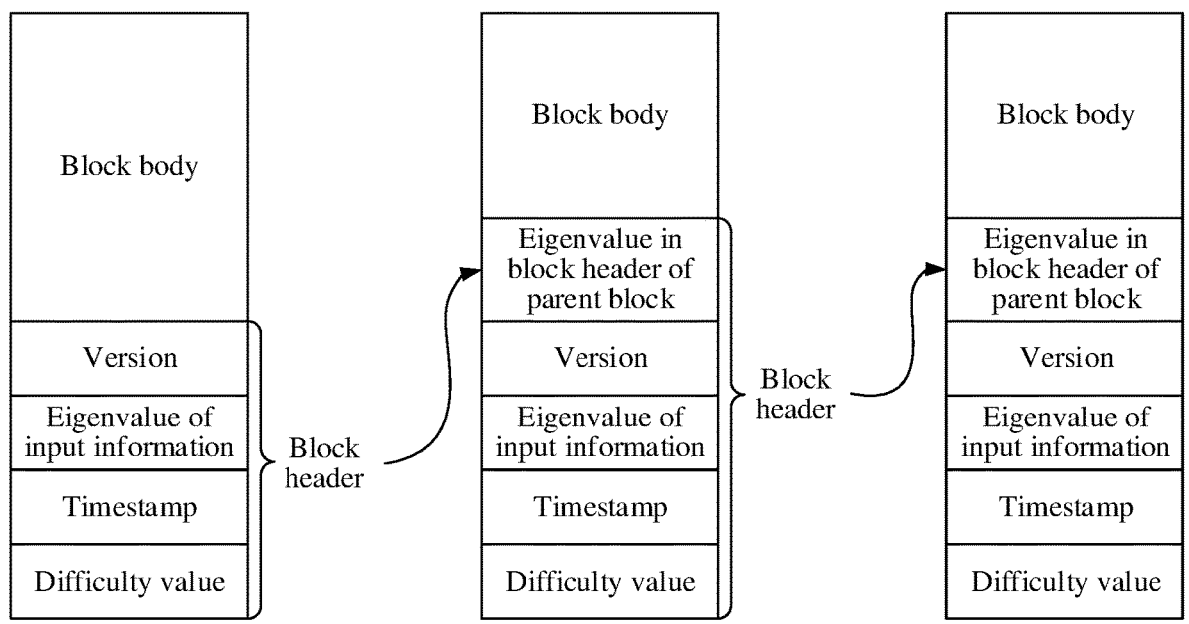
FIG. 1b shows a structure diagram a blockchain provided by an exemplary embodiment of the present disclosure.

All the nodes in the data sharing system store the same blockchain. The blockchain includes multiple blocks. As shown in FIG. 1b, the blockchain includes multiple blocks. A genesis block includes a block header and a block body. The block header stores the eigenvalue, version, timestamp and difficulty value of input information, and the block body stores the input information. The block next to the genesis block takes the genesis block as a parent block, and also includes a block header and a block body. The block header stores the eigenvalue of the input information of the current block, and the eigenvalue, version, timestamp and difficulty value stored in the block header of the parent block, and so on, so that the block data stored in each block in the blockchain is related to the block data stored in the parent block, thereby ensuring the security of the input information in the blocks.

Figure 1C:
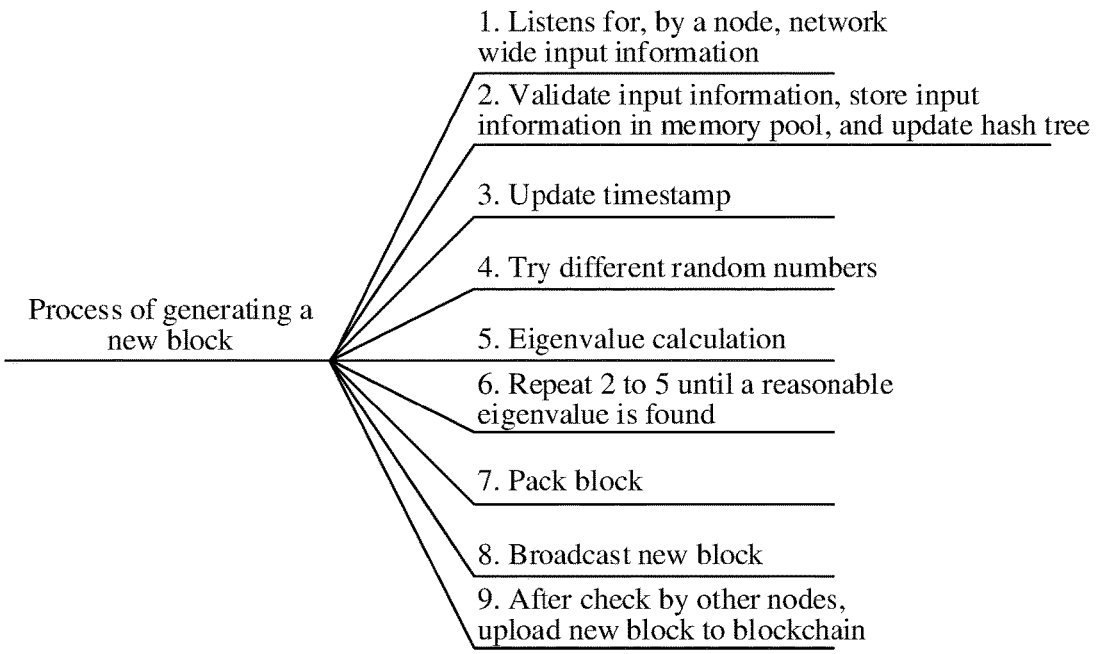
FIG. 1c shows a flowchart for generating blocks provided by an exemplary embodiment of the present disclosure.

When each block in the blockchain is generated, as shown FIG. 1c, in response to that a node where the blockchain is receives input information, the node checks the input information, stores the input information in a memory pool after check, and updates a hash tree thereof used for recording the input information. Then, the update timestamp is updated to the time when the input information is received, and different random number of times are tried to calculate the eigenvalue, such that the calculated eigenvalue meets the following formula:

$$SHA256(SHA256(version+prev\_hash+merkle\_root+ntime+nbits+x))<TARGET$$

where SHA256 is a eigenvalue algorithm for calculating the eigenvalue; version is the version information of relevant block protocols in the blockchain; prev_Hash is the eigenvalue in the block header of the parent block of the current block; merkle_root is the eigenvalue of the input information; ntime is the update time of the update timestamp; nbits is the current difficulty, which is a fixed value for a period of time, and is to be determined again after a fixed period of time; x is a random number; and TARGET is the eigenvalue threshold, which may be determined according to nbits.

In this way, when a random number satisfying the above formula is obtained by calculation, the information may be stored correspondingly, and a block header and a block body are generated to obtain the current block. After that, a node where the blockchain is broadcasts the newly generated block to other nodes in the data sharing system according to the node identifiers of the other nodes in the data sharing system, and the other nodes perform consensus check on the newly generated block and add the newly generated block to their stored blockchain after consensus check. The nodes may perform consensus check on the newly generated block via a consensus algorithm, the consensus algorithm including but is not limited to:

1) Proof of work (Pow):

Pow refers to a measurement method set by a system (e.g., the aforementioned data sharing system) to achieve a certain goal. Simply, Pow is a proof to confirm the workload. The essence is that whoever does more work will have more chances to get extra rewards. Pow, commonly known as "mining", calculates a random number that meets rules through and/or operation, that is, obtains the accounting right this time, sends out the data to be recorded this time, and stores the data together with other nodes in the blockchain network after check. Therefore, Pow has the following advantages: complete decentralization and free access of nodes.

2) Proof-of-stake (Pos)

Pos is an upgraded consensus mechanism of Pow. Specifically, whoever holds electronic resources for a longer period of time (the time length of held electronic resources=the amount of the held electronic resources*the time of holding the electronic resources) has a better chance to obtain the accounting right of the block, where the electronic resources may refer to resources that are stored in electronic accounts in an electronic form and may be circulated through the Internet. According to the proportion and time of electronic resources occupied by each node, the difficulty of mining is reduced proportionally to speed up finding random numbers. Pos shortens the time for reaching a consensus to some extent, but still needs mining.

3) Delegated proof of stake (DPos) share authorization proof mechanism:

The DPos share authorization proof mechanism is similar to vote of the board of directors. Holders of electronic resources vote a certain number of nodes to perform check and accounting on their behalf. To encourage more people to participate in the election, the system will generate a small amount of electronic resources as a reward. The DPos share authorization proof mechanism is to let everyone who holds bitshares vote, resulting in 101 representatives, who may be considered as 101 super nodes or mining pools, and these 101 super nodes have the same rights with each other. From a certain point of view, the DPos share authorization proof mechanism is a bit like a parliamentary system or a people's congress system. In response to that the elected representatives cannot perform their duties (when it is their turn, they fail to generate blocks), these representatives will be removed from the list and the network will elect new super nodes to replace them. This enables the DPos share authorization proof mechanism to significantly reduce the number of nodes participating in check and accounting, and achieve second-level consensus check, but the entire consensus mechanism still depends on electronic resources.

4) Practical Byzantine Fault Tolerance (pbft):

Pbft is a consistency algorithm based on message passing. The algorithm achieves consistency through three stages which may be repeated due to failure. Specifically, assuming that the total number of nodes is 3f+1, and f is the Byzantine error node, first, in response to that the node finds that the leader (e.g., the representative node, the accounting node, or the super node) does wrong, another replica (node) is elected as the leader through the algorithm. Second, the leader broadcasts a value selected thereby to other replica nodes through a pre-prepare message. If the other replica nodes accept the value, a prepare message will be sent. If they do not accept the value, the prepare message will not be sent. Third, once 2f nodes accept the prepare message, the node sends a commit message. Finally, in response to that 2f+1 nodes accept the commit message, the value is determined. The above process enables pbft to reach a consensus that each node is composed of service parties or regulators of service, and the security and stability are guaranteed by the service related parties. Moreover, the time delay of consensus is about 2 to 5 seconds, which basically meets the requirements of commercial real-time processing, improves the efficiency of consensus, and may meet the needs of high-frequency transaction volume.

5) Paxos (a distributed algorithm):

Paxos is a two-stage algorithm, and has three main roles: proposers, acceptors and learners. A proposer puts forward a proposal, an acceptor agrees or rejects the proposal, and a learner obtains the final value after reaching a consensus. Paxos includes two stages: ① Prepare stage: A proposer selects a proposal No. n and sends the prepare request to a majority in the acceptors; After an acceptor receives the prepare request, if the No. of the proposal is greater than those of all prepare requests the acceptor has replied to, the acceptor will reply the proposal it accepted last time to the proposer and promise not to reply to proposals less than n. ② Approval stage: In response to that a proposer receives the replies of most acceptors to the prepare request, the approval stage is entered. The proposer is to send an accept request to the acceptors who reply to the prepare request, including the No. n and value (if there is no accepted value, the proposer may freely determine the value). The acceptors accept the accept request as soon as they receive the accept request, without violating their commitment to other proposers.

Paxos is suitable for a simple fault-tolerant model, that is, there are only failure nodes but no malicious nodes in a system. If the number of failure nodes is x (x is a positive integer), normal operation of the system may be maintained only in response to that the number of nonfailure nodes is x+1.

6) Raft (a distributed consensus algorithm):

Raft includes three roles: followers, candidates and leaders. A node may only be in one of the three statuses at a certain time, and the three roles may change with time and conditions. The initial status of all nodes is follower. Followers who do not receive heartbeat packets after timeout will become candidates and broadcast voting requests. The nodes that obtain the majority of votes will become leaders. The process of this round of voting is to decide who is the first to send, and each node will only give one vote. The leader nodes periodically send heartbeat packets to other nodes, and failure of the leader nodes will trigger a new round of voting process.

In practical applications, when blockchains are applied to some scenarios, e.g., bill service scenarios, or data storage scenarios of commercial institutions, not all nodes in the blockchain network have sufficient resources and need to become nodes participating in the blockchain consensus. Moreover, for the sake of data security, when a blockchain system involves relevant data with high security, the common data peer blockchain deployment methods are not applicable. To adapt to service needs (e.g., intranet and internet, service network, and office network separation) and further improve the security and confidentiality of data, this embodiment of the present disclosure provides a two-layer chain, which forms a two-layer network architecture of "witness subnet—consensus subnet" through peer to peer (P2P) network, where the P2P network is a network of point-to-point connection, and each node of point-to-point connection is called a peer node. P2P network is based on a specific network protocol, so that peer nodes maintain the network status without the need of a central node. Each node maintains the node status of the whole network and its connection status with neighboring nodes through broadcast interaction with the neighboring nodes.

Figure 1D:
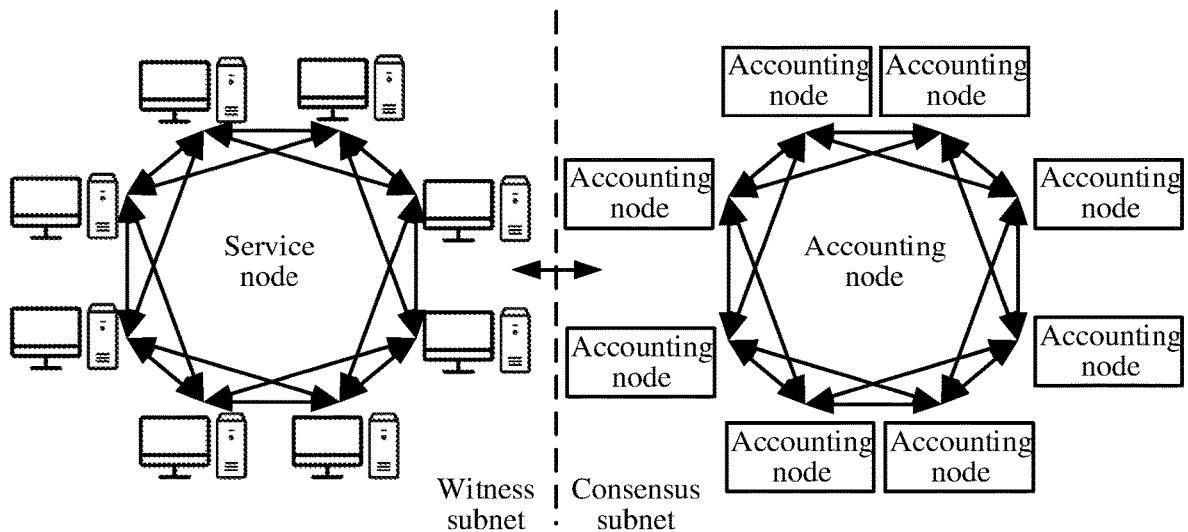
FIG. 1d shows an architecture diagram of a two-layer network provided by an exemplary embodiment of the present disclosure.

FIG. 1d shows an architecture diagram of a two-layer network provided by an exemplary embodiment of the present disclosure. As shown in FIG. 1d, the blockchain network includes a witness subnet and a consensus subnet. service nodes are deployed in the witness subnet in a public network, and the consensus subnet is deployed with accounting nodes which run a blockchain consensus protocol. The witness subnet and the consensus subnet interact through a routing boundary represented by a dotted line. The service nodes in the witness subnet mainly perform service execution, do not participate in accounting consensus, and obtain block header data and some authorized visible block data from the consensus subnet through identity authentication. The consensus subnet is the core network in the blockchain network, and is used for performing accounting consensus on the blockchain network. Generally, the witness subnet and the consensus subnet are in different network environments, the witness subnet is in a public network, and the consensus subnet is in a private network. Since the consensus subnet is in a relatively secure private network, mutual access therein should have a consensus mechanism to ensure security, and additional identity management and network control are not needed. However, the service nodes are in the public network and may be accessed by other uncertain network terminals. Therefore, the behavior of the service nodes and other possible nodes accessing the consensus subnet needs to be strictly controlled.

Figure 1E:
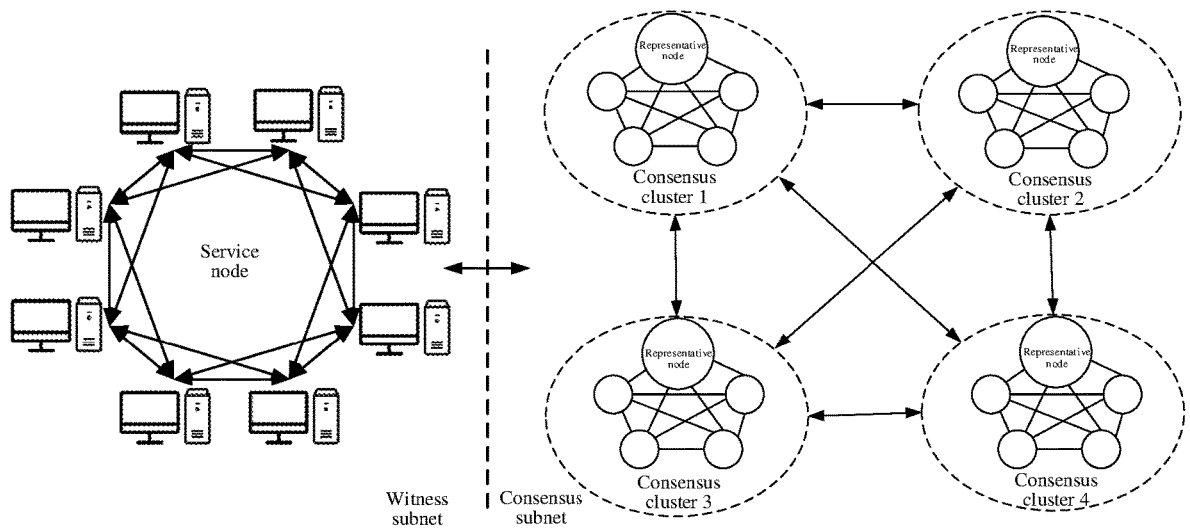
FIG. 1e shows an architecture diagram of another two-layer network provided by an exemplary embodiment of the present disclosure.

In a feasible implementation, these accounting nodes in the consensus subnet may also be divided into multiple consensus clusters, that is, multiple consensus clusters may be deployed in the consensus subnet, and each consensus cluster may include at least one accounting node. Consensus clusters may be divided according to different rules, including: service types, for example, accounting nodes that process service data of the same service type are divided into the same consensus cluster; distance between accounting nodes, for example, two or more accounting nodes whose distance therebetween is less than a distance threshold are divided into the same consensus cluster; and so on. In this implementation, the architecture of the two-layer blockchain network may be changed to that in FIG. 1e. As shown in FIG. 1e, the blockchain network includes a witness subnet and a consensus subnet. Multiple consensus clusters are deployed in the consensus subnetwork, and each consensus cluster contains at least one accounting node. Any service node in the witness subnet may establish information connection with the accounting nodes deployed by a consensus cluster in the consensus subnet. Assuming that the consensus clusters shown in FIG. 1e are divided according to service types, each consensus cluster may be used for providing consensus services for service data of one or more service types. For example, a consensus cluster 1 in FIG. 1e may be a cluster that provides consensus services for service data of the invoice service type, that is, the accounting nodes in the consensus cluster 1 only perform consensus processing on invoice data; a consensus cluster 2 may be a cluster that provides consensus services for service data of the credit investigation service type, that is, the accounting nodes in the consensus cluster 2 only perform consensus processing on service data related to credit investigation; and so on.

In the architecture shown in FIG. 1e, all consensus clusters jointly maintain a blockchain in the blockchain network, and the blockchain is called a main chain and contains all information of all service ecosystems in the blockchain network. Each consensus cluster may also organize a blockchain sub-chain of its own service, and the blockchain sub-chain within each consensus cluster only contains the information of the service of the respective consensus cluster. Each consensus cluster may elect an accounting node as a representative node in its own consensus cluster. The representative node not only participates in consensus processing of the blockchain sub-chain within its own consensus cluster, but also participates in consensus processing of the main chain. The non-representative nodes in the consensus cluster, i.e., the accounting nodes in the consensus cluster except the representative node, only participate in consensus processing of the blockchain sub-chain within the consensus cluster. In the consensus subnet, the representative nodes elected by all consensus clusters jointly form a consensus committee of the main chain to jointly perform consensus processing of the main chain.

Figure 1F:
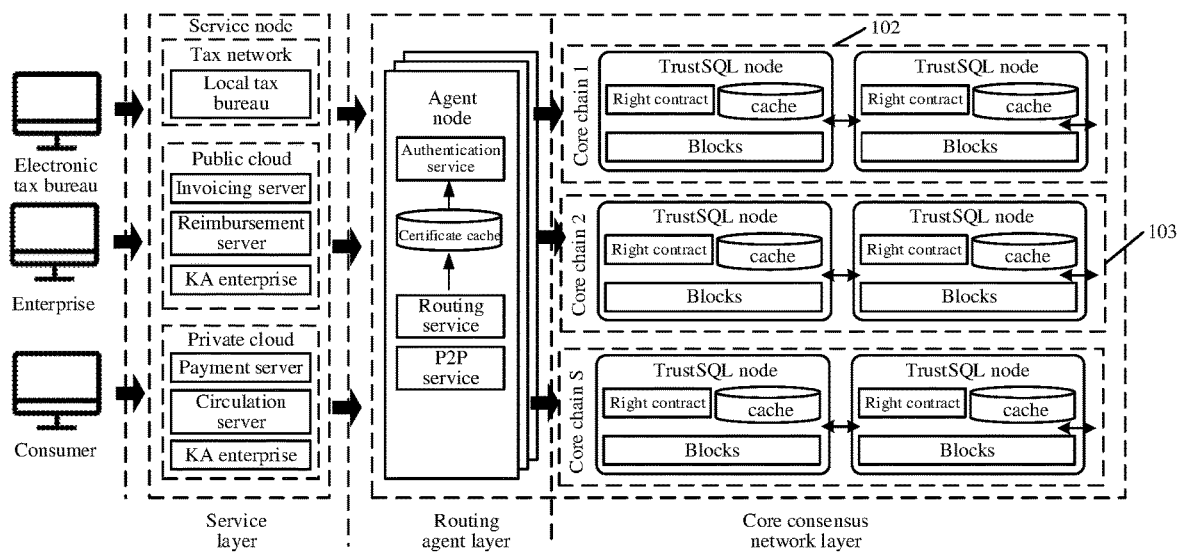
FIG. 1f shows a scenario architecture diagram of an electronic invoice service based on a two-layer network provided by an exemplary embodiment of the present disclosure.

Taking a blockchain network as a network providing consensus services for electronic invoices as an example, the scenario architecture of the two-layer network proposed in this embodiment of the present disclosure is shown in FIG. 1f. As shown in FIG. 1f, the blockchain network includes: a service layer, a routing agent layer and a core consensus network layer, where the service layer, the routing agent layer and the core consensus network layer constitute the entire complete blockchain service system. ① The service layer is in a witness sub-network and includes at least one service node which may specifically be an SPV (Simplified Payment Verification) node that maintains a normal unstructured P2P network, and the service node may handle tax (of a local tax bureau), bill (enterprise invoicing), payment (enterprise cash flow) and other services. ② The core consensus network layer is in a consensus subnet and includes each consensus cluster, e.g., a consensus cluster 102, a consensus cluster 103, . . . , and each consensus cluster maintains a blockchain sub-chain within the cluster, for example, the consensus cluster 102 maintains a core chain 1 within its cluster, and the consensus cluster 103 maintains a core chain 2 within its cluster. ③ The routing agent layer includes at least one agent node which may provide routing service, authentication service, certificate cache service, peer-to-peer (P2P) service, and the like. The certificate cache service involves a certificate system (PKI, Public Key Infrastructure). In the certificate system, the certificate is an identity certificate of an owner of a public key, and is issued by an authority (CA). Based on the public key certificate system, asymmetric encryption and digital signature of information may be implemented. Information interaction between the service layer and the core consensus network layer is carried out through the routing agent layer, that is, the service layer submits the service operation interaction to the core consensus network layer through the routing agent layer, and thus the routing agent layer isolates the service layer from the core consensus network layer.

Based on the above introduction to the basic structure of the two-layer network involved in this embodiment of the present disclosure, the following is a brief introduction to the blockchain-based data processing solution proposed by this embodiment of the present disclosure based on the above two-layer network structure, and the solution may improve the processing efficiency of cross-chain service. The solution may be implemented by a first representative node in the consensus committee shown in FIG. 1e, and the first representative node may be any representative node in the consensus committee. The representative node may specifically be a terminal device or a server. The terminal device may include, but is not limited to: smart phones (e.g., Android phones, and IOS phones), tablets, portable personal computers, mobile Internet devices (MID) and other devices, which are not limited in this embodiment of the present disclosure. The server may be an independent physical server, or a server cluster or distributed system including multiple physical servers, or a cloud server that provides basic cloud computing services such as cloud services, cloud databases, cloud computing, cloud functions, cloud storage, network services, cloud communications, middleware services, domain name services, security services, Content Delivery Network (CDN), and big data and artificial intelligence platforms, which are not limited in the present disclosure.

In specific implementation, a blockchain contains at least one block, e.g., a blockchain may contain M interconnected blocks, M being a positive integer. The blockchain is located in a blockchain network. As shown in FIG. 1e, the blockchain network includes a witness subnet and a consensus subnet, the witness subnet contains at least one service node, and the consensus subnet contains at least two consensus clusters, e.g., N consensus clusters, N being an integer greater than 1. Each consensus cluster includes multiple accounting nodes, and each consensus cluster elects one accounting node in its own consensus cluster as a representative node, then N consensus clusters may elect N representative nodes. The N representative nodes form a consensus committee of the blockchain. The blockchain-based data processing method is implemented by a first representative node in the consensus committee, the first representative node being any representative node in the consensus committee. The general principle of the blockchain-based data processing solution is as follows:

(1) The first representative node obtains on-chaining indication information of the M+1 block of the blockchain, the on-chaining indication information being used for indicating the type of a next block to be on-chained, that is, the type of the M+1 block. The type of a block may be a coexclusive type, an exclusive type, or a common type. In some embodiments, exclusive-type service data is only allowed to be stored in an exclusive type block; coexclusive-type service data is allowed to be stored in coexclusive type blocks in a consensus cluster; and common type service data can be stored in a common type block or an exclusive type block. When the common type service data is stored in an exclusive type block, a priority of the common type service data is lower than a priority of exclusive-type service data stored in the same block. The on-chaining indication information of the M+1 block is generated according to the bidding result information of the M+1 block. The bidding result information of the M+1 block is obtained by all representative nodes in the blockchain network performing consensus processing on the bidding information of the M+1 block (e.g., determining a second representative node with the proposal right of the M+1 block according to the bidding information). The bidding result information of the M+1 block carries the type of the M+1 block. The bidding information is broadcast by the representative node that needs to bid for the M+1 block to other representative nodes in the blockchain network during the on-chaining (consensus) process of the M block. The bidding information is used for bidding for the proposal right of the M+1 block. The bidding information carries relevant information about the service data to be packed in the M+1 block (e.g., the amount of service data packed in the M+1 block, the identifiers of service parties related to the M+1 block, and the type of the service data packed in the M+1 block). Here, an amount of service data may refer to a volume of service data and can be quantified with a number indicating a quantity of pieces of service data. The representative node that obtains the proposal right of the M+1 block may generate a target block waiting for consensus based on the bidding information of the representative node (that is, pack the service data reported in the bidding information to generate the target block waiting for consensus).

(2) A first representative node obtains the target block waiting for consensus in the blockchain network. The target block is broadcast to each representative node in the blockchain network, by the representative node that obtains the proposal right of the M+1 block in the blockchain network, after the service data (i.e., the service data to be packed in the M+1 block indicated by the representative node in the bidding information) to be on-chained related to the M+1 block is packed.

(3) In response to that the on-chaining indication information indicates that the M+1 block is of a coexclusive type, consensus check is performed on the target block according to the consensus rules for the coexclusive type (i.e., each representative node independently checks the target block according to the consensus rules, and then the final check result is determined according to its own check result and the check results of the target block broadcast by other representative nodes in the blockchain network). Coexclusive blocks are used for storing independent cross-chain service. Each cross-chain service is an independent cross-chain service, and is participated by at least two service parties. Each service party provides at least one service data to be deposited (i.e., each coexclusive block is used for storing the service data related to a cross-chain service). The consensus rules are used for checking whether the target block meets on-chaining conditions (e.g., checking whether the service data in the target block belongs to the same cross-chain service, whether the service parties of the target block match the identifiers of multiple coexclusive parties of the M+1 block indicated by the on-chaining indication information, and so on).

(4) In response to that the target block passes the consensus check, the target block is added as the M+1 block to the blockchain (i.e., the target block is on-chained and the updated blockchain is obtained).

In this embodiment of the present disclosure, the on-chaining indication information of the M+1 block of the blockchain and the target block waiting for consensus in the blockchain network are obtained. In response to that the on-chaining indication information indicates that the M+1 block is of a coexclusive type, consensus check is performed on the target block according to the consensus rules for the coexclusive type. Coexclusive blocks are used for storing independent cross-chain services. In response to that the target block passes the consensus check, the target block is added as the M+1 block to the blockchain. It can be seen that in response to that cross-chain interaction is involved, relevant service data of independent cross-chain service may be stored in a block through a coexclusive block, which may improve the situation that the relevant service data in multiple blocks needs to be checked during check of cross-chain service, thereby improving the check efficiency of cross-chain service and improving the processing efficiency of cross-chain service.

Based on the blockchain-based data processing solution described above, this embodiment of the present disclosure proposes a more detailed blockchain-based data processing method. The blockchain-based data processing method proposed by this embodiment of the present disclosure is described in detail with reference to the accompanying drawings.

Figure 2:
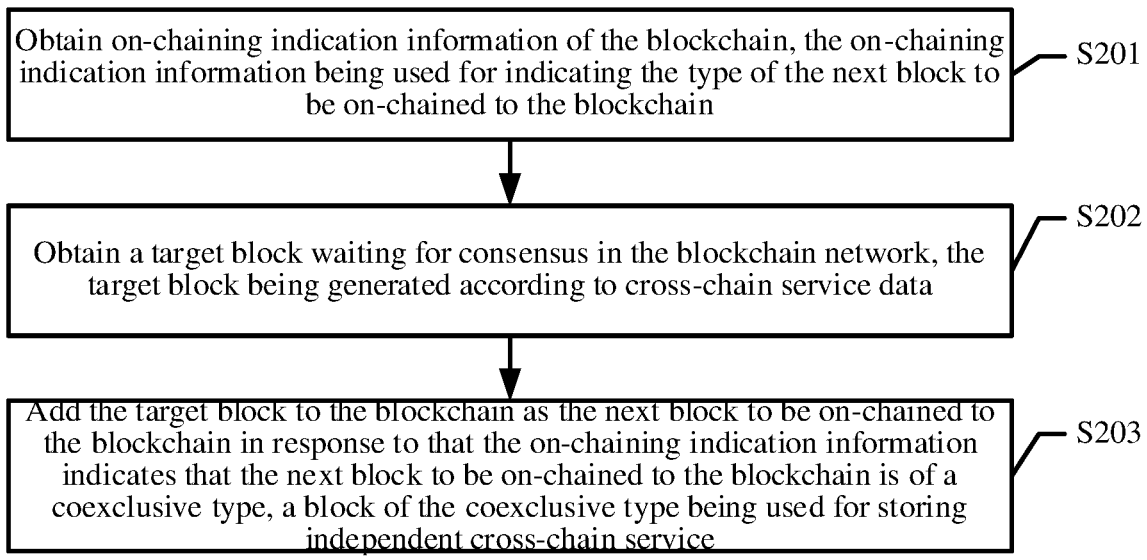
FIG. 2 shows a flowchart of a blockchain-based data processing method provided by an exemplary embodiment of the present disclosure.

FIG. 2 shows a flowchart of a blockchain-based data processing method provided by an exemplary embodiment of the present disclosure, where the blockchain contains at least one interconnected block. The blockchain is located in a blockchain network. As shown in FIG. 1e, the blockchain network includes a witness subnet and a consensus subnet, the witness subnet contains at least one service node, and the consensus subnet contains at least two consensus clusters; each consensus cluster includes multiple accounting nodes, and each consensus cluster elects one accounting node in its own consensus cluster as a representative node; and the representative nodes of all consensus clusters form a consensus committee of the blockchain. The blockchain-based data processing method is implemented by a first representative node in the consensus committee, the first representative node being any representative node in the consensus committee. The blockchain-based data processing method may include, but is not limited to, steps S201 to S203:

S201. Obtain on-chaining indication information of the blockchain, the on-chaining indication information being used for indicating the type of a next block to be on-chained.

The on-chaining indication information is used for indicating the information of the next block to be on-chained, specifically the type of the next block to be on-chained, e.g., coexclusive type, exclusive type, and common type. In specific applications, the blockchain contains M interconnected blocks, M being an integer greater than 1. The consensus subnet contains N consensus clusters, N being an integer greater than 1. The N consensus clusters elect N representative nodes. That is, there are already M blocks in the blockchain, the next block to be on-chained is the M+1 block, and the on-chaining indication information may indicate the type of the M+1 block, e.g., coexclusive type, exclusive type, and common type. The on-chaining indication information of the M+1 block is generated according to the bidding result information of the M+1 block. The bidding result information of the M+1 block is obtained by all representative nodes in the blockchain network performing consensus processing on the bidding information of the M+1 block (e.g., determining a second representative node with the proposal right of the M+1 block according to the bidding information). The bidding result information of the M+1 block carries the type of the M+1 block.

The bidding information is broadcast to other representative nodes in the blockchain network by a representative node that needs to bid for the next block during the on-chaining process of the current block. For example, in response to that there are M blocks in the blockchain, the bidding information is broadcast to other representative nodes in the blockchain network by the representative node that needs to bid for the M+1 block during the on-chaining (consensus) process of the M block. The bidding information is used for bidding for the proposal right of the M+1 block. The bidding information carries relevant information about the service data to be packed in the M+1 block (e.g., the amount of service data packed in the M+1 block, the identifiers of service parties related to the M+1 block, and the type of the service data packed in the M+1 block). The representative node that obtains the proposal right of the M+1 block may generate a target block waiting for consensus based on the bidding information of the representative node (that is, pack the service data reported in the bidding information to generate the target block waiting for consensus).

Specifically, the first representative node is specifically a computer device which obtains the on-chaining indication information of the blockchain. The on-chaining indication information is used for indicating the type of a next block to be on-chained. The computer device may determine the type of the next block to be on-chained according to the on-chaining indication information.

S202. Obtain a target block waiting for consensus in the blockchain network, the target block being generated according to cross-chain service data.

The target block waiting for consensus is obtained by packing block data related to the next block to be on-chained by the representative node of the block having the proposal right. The target block is generated according to the cross-chain service data, that is, the target block is obtained by packing the service data of the cross-chain service. Each cross-chain service is an independent cross-chain service, and is participated by at least two service parties. Each service party provides at least one service data to be deposited, i.e., each coexclusive block is used for storing the service data related to a cross-chain service. Specifically, there are M blocks in the blockchain, and in response to that the on-chaining indication information indicates the type of the M+1 block, the target block waiting for consensus may be obtained by packing the block data (i.e., the service data to be packed in the M+1 block indicated by the representative node in the bidding information) to be on-chained related to the M+1 block. The representative node of the block having the proposal right is the representative node in the blockchain network that obtains the packing right (i.e., the right to generate the target block waiting for consensus) of the M+1 block.

In one implementation, the representative node having the proposal right may obtain deposit information, including cross-chain service data, of one or more service data related to the M+1 block from a resource pool of the blockchain network, and generate a target block waiting for consensus according to the deposit of the service data.

After the target block is generated, the representative node having the proposal right broadcasts the target block to each representative node in the blockchain network. A first representative node may obtain the target block waiting for consensus through the broadcast of the representative node having the proposal right.

Specifically, a computer device obtains a target block waiting for consensus in a blockchain network. The target block may be generated by a representative node having the proposal right according to cross-chain service data. The representative node having the proposal right may broadcast the generated target block, so that the computer device obtains the target block.

S203. Add the target block to the blockchain as the next block to be on-chained in response to that the on-chaining indication information indicates that the next block to be on-chained is of a coexclusive type, the coexclusive block being used for storing independent cross-chain service.

The types of blocks may include a coexclusive type. Each coexclusive block is used for storing independent cross-chain service. Each cross-chain service is an independent cross-chain service, and is participated by at least two service parties. Each service party provides at least one service data to be deposited, i.e., each coexclusive block is used for storing the service data related to a cross-chain service. For example, in response to that a service party A and a service party B participate in a cross-chain service 1, the service party B and a service party C participate in a cross-chain service 2, the service party A, the service party B and the service party C jointly participate in a cross-chain service 3, the cross-chain service 1 to the cross-chain service 3 are three independent cross-chain services, that is, the cross-chain service 1 to the cross-chain service 3 are stored in three different coexclusive blocks. The service data related to the cross-chain service 1 cannot be stored in the block used for storing the service data related to the cross-chain service 2 or the cross-chain service 3. Similarly, the service data related to the cross-chain service 2 cannot be stored in the block used for storing the service data related to the cross-chain service 1 or the cross-chain service 3, and the service data related to the cross-chain service 3 cannot be stored in the block used for storing the service data related to the cross-chain service 1 or the cross-chain service 2.

Specifically, in response to that the next block to be on-chained is of a coexclusive type, it indicates that the next block that needs a consensus in the blockchain is used for storing the cross-chain service data of independent cross-chain service. Then a computer device may add the target block to the blockchain as the next block to be on-chained, so that the target block is on-chained. In specific implementation, the computer device may perform consensus check on the target block according to consensus rules for the coexclusive type, and after the consensus check is passed, add the target block to the blockchain as the next block to be on-chained to the blockchain, thereby ensuring the accuracy of on-chaining of the blockchain. The consensus rules are used for checking whether the target block meets on-chaining conditions, and the on-chaining conditions may be determined according to the on-chaining indication information (e.g., checking whether the service data in the target block belongs to the same cross-chain service, whether the service parties of the target block match the identifiers of multiple coexclusive parties of the M+1 block indicated by the on-chaining indication information, and so on).

In one implementation, a first representative node checks the target block according to the consensus rules, and then determines the final consensus check result according to its own check result and the check results of the target block broadcast by other representative nodes than the first representative node in the blockchain network. The target block passing the consensus check means: the first representative node determines that the target block meets the on-chaining conditions according to its own check result and the check results of the target block broadcast by other representative nodes than the first representative node in the blockchain network. The first representative node records the target block as the M+1 block of the blockchain. In response to that the next block to be on-chained is of the coexclusive type, the target block generated according to cross-chain service data is added to the blockchain, which may avoid performing cross-chain service data processing on multiple blocks separately during the cross-chain service processing, effectively realize isolation processing of cross-chain service, reduce interactive processing between multiple blocks, and thus improve the processing efficiency of cross-chain service.

In this embodiment of the present disclosure, the on-chaining indication information of the blockchain, and the target block generated according to cross-chain service data waiting for consensus in the blockchain network are obtained. In response to that the on-chaining indication information indicates that the next block to be on-chained is of a coexclusive type for storing an independent cross-chain service, the target block is added to the blockchain as the next block to be on-chained. It can be seen that in response to that cross-chain interaction is involved, relevant service data of independent cross-chain service may be stored in a block through a coexclusive block, which may improve the situation that the relevant service data in multiple blocks needs interactive processing during processing of cross-chain service, thereby improving the processing efficiency of cross-chain service.

In an embodiment, the adding the target block to the blockchain as a next block to be on-chained in response to that the on-chaining indication information indicates that the next block to be on-chained is of a coexclusive type includes: perform consensus check on the target block according to consensus rules for the coexclusive type in response to that the on-chaining indication information indicates that the next block to be on-chained is of a coexclusive type; and add the target block to the blockchain as the next block to be on-chained in response to that the target block passes the consensus check.

The consensus rules are used for checking whether the target block meets on-chaining conditions, and the on-chaining conditions may be determined according to the on-chaining indication information, e.g., including, but not limited to checking whether the service data in the target block belongs to the same cross-chain service, whether the service parties of the target block match the identifiers of multiple coexclusive parties of the M+1 block indicated by the on-chaining indication information, and so on. The target block passing the consensus check means that the first representative node determines that the target block meets the on-chaining conditions according to its own check result and the check results of the target block broadcast by other representative nodes than the first representative node in the blockchain network, and then the target block may be pushed onto the blockchain.

Specifically, in case of determining that the on-chaining indication information indicates that the next block to be on-chained is of a coexclusive type, it indicates that the next block to be on-chained needs to carry cross-chain service data, and then a computer device may query consensus rules for the coexclusive type. The computer device performs consensus check on the target block according to consensus rules for the coexclusive type, and in response to that the consensus check is passed, the computer device adds the target block to the blockchain as the next block to be on-chained, thereby on-chaining the target block.

In this embodiment, the computer device performs consensus check on the target block according to the consensus rules for the coexclusive type, and adds the target block to the blockchain in response to that the consensus check is passed, thereby ensuring that the target block meets the on-chaining conditions and ensuring the success rate of on-chaining the target block.

Figure 3:
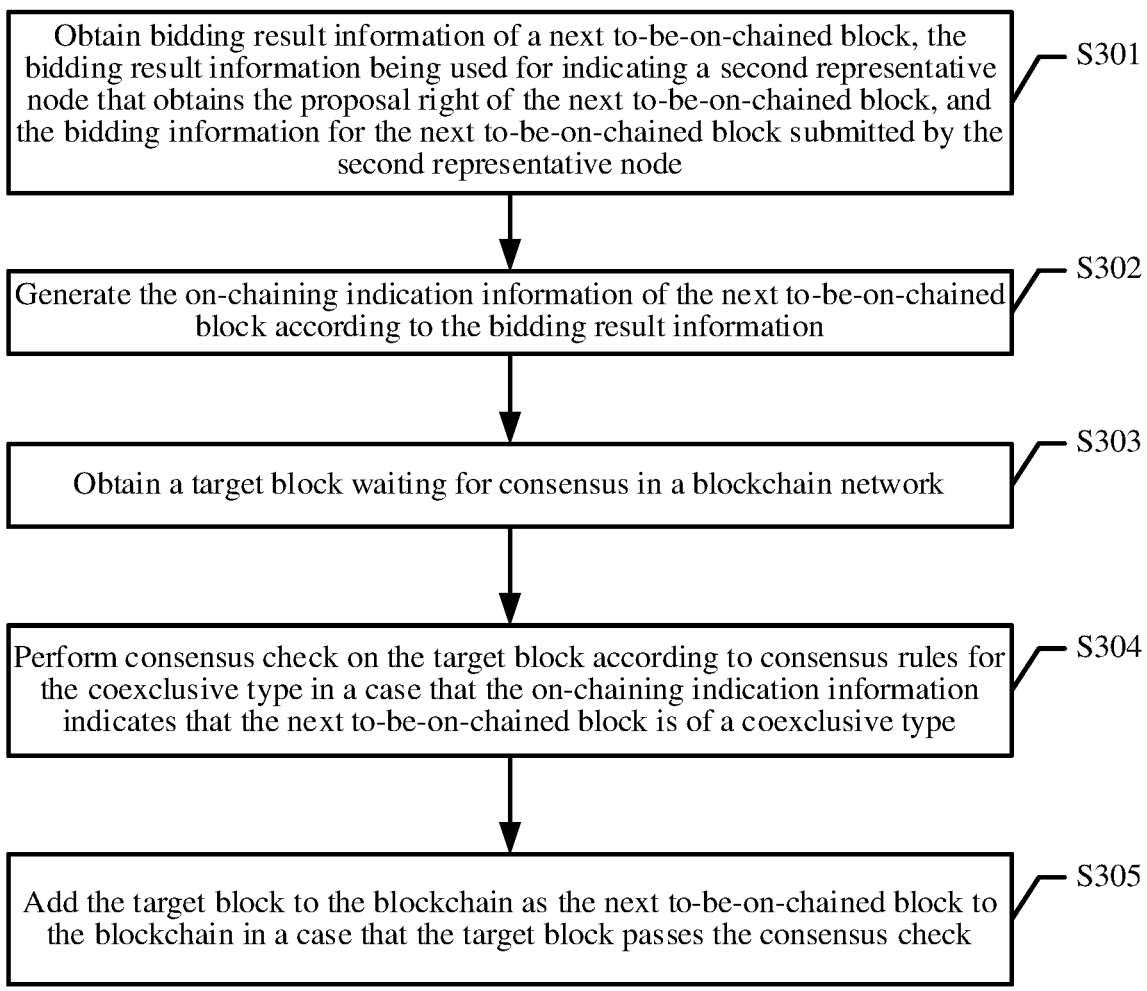
FIG. 3 shows a flowchart of another blockchain-based data processing method provided by an exemplary embodiment of the present disclosure.

FIG. 3 shows a flowchart of another blockchain-based data processing method provided by an exemplary embodiment of the present disclosure, where the blockchain contains M interconnected blocks, M being a positive integer. The blockchain is located in a blockchain network. As shown in FIG. 1e, the blockchain network includes a witness subnet and a consensus subnet, the witness subnet contains at least one service node, and the consensus subnet contains N consensus clusters, N being an integer greater than 1. Each consensus cluster includes multiple accounting nodes, and each consensus cluster elects one accounting node in its own consensus cluster as a representative node. The N representative nodes form a consensus committee of the blockchain. The method is implemented by a first representative node in the consensus committee, the first representative node being any representative node in the consensus committee. The blockchain-based data processing method may include, but is not limited to, steps S301 to S305:

S301. Obtain bidding result information of the next block to be on-chained to a blockchain, the bidding result information being used for indicating a second representative node that obtains the proposal right of the next block to be on-chained, and the bidding information for the next block to be on-chained submitted by the second representative node.

The bidding result information of the next block to be on-chained is obtained by all representative nodes in the blockchain network performing consensus processing on the bidding information of the next block to be on-chained, and is submitted by the second representative node having the proposal right of the next block to be on-chained according to the bidding information. The bidding result information may indicate a second representative node that obtains the proposal right of the next block to be on-chained, and the bidding information for the next block to be on-chained submitted by the second representative node. In response to that there are M blocks in a blockchain, the bidding result information of the M+1 block is obtained by all representative nodes in the blockchain network performing consensus processing on the bidding information of the M+1 block (e.g., determining a second representative node having the proposal right of the M+1 block according to the bidding information). The bidding result information of the M+1 block carries the type of the M+1 block.

The bidding information is broadcast by the representative node that needs to bid for the M+1 block to other representative nodes in the blockchain network during the on-chaining (consensus) process of the M block. The bidding information is used for bidding for the proposal right of the M+1 block (bidding for an exclusive or coexclusive block). The bidding information carries relevant information about the service data to be packed in the M+1 block (e.g., the amount of service data packed in the M+1 block, the identifiers of service parties related to the M+1 block, and the type of the service data packed in the M+1 block). The representative node that obtains the proposal right of the M+1 block may generate a target block waiting for consensus based on the bidding information of the representative node (that is, pack the service data reported in the bidding information to generate the target block waiting for consensus). For example, in response to that the representative node 1 needs to deposit 1000 service data related to the representative node 1, the representative node 1 broadcasts bidding information 1 to a consensus committee. The bidding information 1 is used for indicating the representative node 1 requesting the proposal right of the M+1 block. The bidding information 1 includes the amount of service data that needs to be stored in the M+1 block by the representative node, the identifiers (e.g., address, and signature) of the representative node 1, and bidding resources for bidding for the M+1 block. In response to that the representative node 1 obtains the proposal right of the M+1 block, the representative node 1 generates a target block waiting for consensus according to the amount of the service data that needs to be stored in the M+1 block indicated in the bidding information 1.

In a specific implementation, in the bidding transaction, the identifier of the representative node requesting the proposal right of the M+1 block and the amount of service data to be stored in the M+1 block are specified. In response to that the consensus committee is to reach a consensus on the bidding transaction, the consensus committee checks whether the amount of service data to be deposited in a resource pool meets the specified amount of the bidding transaction. For example, assuming that the bidding transaction specifies that a second representative node will put 1000 exclusive service data in the M+1 block, the consensus committee is to reach a consensus on the bidding transaction by checking whether there are more than 1000 exclusive service data or common service data from the second representative node in a transaction pool. In addition, the consensus committee may also check the validity of the current right of the representative node corresponding to the bidding transaction in a smart contract (e.g., check whether the service data in the last block of a blockchain sub-chain maintained by the representative node is successfully pushed onto a public blockchain jointly maintained by the consensus committee).

In the case of cross-chain, after multiple consensus clusters complete cross-chain service interaction, the service parties participating in the cross-chain service randomly negotiate for a representative node, and the representative node carries the signatures of all service parties participating in the cross-chain service to bid for a coexclusive block. The bidding information includes the identifiers of service parties that jointly and exclusively occupy the M+1 block, the amount of service data to be stored into the M+1 block by each service party, and the like. For example, in response to that a consensus cluster 1 to a consensus cluster 3 jointly participate in a cross-chain service 1, the consensus cluster 1 to the consensus cluster 3 may determine a representative node 1 of the consensus cluster 1 as the representative node through negotiation to apply, on behalf of the consensus cluster 1 to the consensus cluster 3, for a coexclusive block for storing service data related to the cross-chain service 1. The bidding information 1 generated by the representative node 1 includes the identifier of the representative node of the consensus cluster 1 to the consensus cluster 3, the amount of the service data to be stored into the M+1 block by the consensus cluster 1 to the consensus cluster 3 (i.e., all service parties), and the like.

In an embodiment, the bidding information includes at least one of the amount of service data to be packed in the next block to be on-chained, the identifiers of service parties related to the service data, and the type of the service data.

The target block also stores service data to be deposited of each of multiple service parties, and the amount of service data to be packed in the next block to be on-chained refers to the occupation amount of each of multiple coexclusive parties. The target block is related to a target service, and the identifiers of service parties related to the service data refer to the identifiers of the target service. The type of service data refers to the type of cross-chain service data to be packed in the next block to be on-chained.

In this embodiment, the bidding information includes at least one of the amount of service data to be packed in the next block to be on-chained, the identifiers of service parties related to the service data, and the type of the service data. The corresponding on-chaining indication information may be generated from the bidding information to perform consensus check on the target block through the on-chaining indication information to ensure the accuracy of cross-chain service data processing.

In one implementation, the bidding information includes the waiting time and the amount of bidding resources. The bidding result information is generated after the consensus committee performs consensus check on the bidding information based on the waiting time and the amount of bidding resources in the bidding information, and the consensus check of the bidding information is successful.

Specifically, the consensus committee performs consensus check on the bidding information based on the waiting time and the amount of bidding resources in the bidding information sent by each representative node (for example, check whether there is service data to be deposited indicated by the bidding information in a resource pool of the blockchain network, whether the amount of service data to be deposited in the resource pool of the blockchain network is consistent with the amount indicated by the bidding information, and the like). Take the bidding information of a coexclusive block as an example, the bidding information may include the identifiers of service parties participating in a cross-chain service and the amount of service data to be packed in the M+1 block by each service party. The consensus committee may check whether the service parties indicated by the bidding information participate in the cross-chain service, whether the amount of service data to be packed in the M+1 block is accurate with all service parties, and so on. After successful consensus check of the bidding information, the bidding result information is generated. In one embodiment, in response to that there are multiple representative nodes bidding for a block, the total bidding amount is calculated according to the waiting time and the amount of bidding resources, and consensus check is performed on the bidding information with the largest total bidding amount. For example, assuming the calculation rule of the total bidding amount as: Total bidding amount= (Waiting time+Amount of bidding resources)*Weight corresponding to service priority, and assuming that the waiting time is 3 minutes, the amount of bidding resources is 97, and the weight corresponding to service priority is 0.8 for a national tax bureau, the waiting time is 5 minutes, the amount of bidding resources is 145, and the weight corresponding to service priority is 0.5 for a municipal tax bureau, and the waiting time is 20 minutes, the amount of bidding resources is 180, and the weight corresponding to service priority is 0.3 for a county tax bureau, the total bidding amount of the national tax bureau=(3+97)*0.8=80, the total amount of bidding of the municipal tax bureau=(5+145) *0.5=75, and the total bidding amount of the county tax bureau=(20+180)*0.3=60. Since 80>75>60, consensus check is performed on the bidding information broadcast by the national tax bureau. In response to that the consensus check of the bidding information is passed, the bidding result information is generated based on the bidding information.

In this embodiment, the consensus committee generates the bidding result information after performing consensus check on the bidding information based on the waiting time and the amount of bidding resources in the bidding information, thus ensuring the authority validity of the bidding result information and orderly proceeding of blockchain-based data processing.

In one embodiment, the waiting time is negatively correlated with the amount of bidding resources. The bidding information is obtained at least by performing weighted calculation according to the waiting time and the amount of bidding resources.

The bidding information includes waiting time and the amount of bidding resources. The bidding information may be calculated and summed according to the waiting time, the amount of bidding resources and the corresponding weight. Simply, the waiting time is inversely proportional to the amount of bidding resources (i.e., the longer the waiting time is, the less the bidding resources required; the shorter the waiting time is, the more the bidding resources required). The waiting time refers to the time from when the target representative node requests the proposal right of the block to the current time (during which the target representative node does not obtain the proposal right of the block). The target representative node may be any representative node in the consensus committee. For example, if a representative node 1 requests the proposal right of the block 10 minutes ago, and the representative node 1 does not obtain the proposal right of the block within 10 minutes, the waiting time of the representative node 1 is 10 minutes. For another example, if a representative node 2 requests the proposal right of the block 30 minutes ago, and the representative node 2 obtains the proposal right of the block 17 minutes ago and obtains the proposal right of the block again 8 minutes ago, the waiting time of the representative node 2 is 8 minutes. Bidding resources may be configured according to the actual situation. For example, bidding resources may include one or more of the following: physical resources, virtual goods, the amount of service data to be deposited, and the like.

In this embodiment, the bidding information is obtained by performing weighted calculation according to the waiting time and the amount of bidding resources, thereby effectively balancing in view of the waiting time and the amount of bidding resources, ensuring the assignment effect of the proposal right, and ensuring orderly proceeding of blockchain-based data processing.

In one embodiment, the bidding information is obtained by performing weighted calculation according to the waiting time, the amount of bidding resources and the weight corresponding to service priority.

Different representative nodes may correspond to different priorities (taking tax bureaus as an example, the service (invoicing) priority of a national tax bureau is higher than the service (invoicing) priority of a municipal tax bureau, and the service (invoicing) priority of a municipal tax bureau is higher than the service (invoicing) priority of a county tax bureau). The higher the service priority, the greater the corresponding weight. The bidding information may be obtained by calculation according to the waiting time, the amount of bidding resources and the weight corresponding to the service priority.

In this embodiment, the bidding information is obtained by performing weighted calculation according to the waiting time, the amount of bidding resources and the weight corresponding to the service priority, thereby effectively balancing in view of the waiting time and the amount of bidding resources by using the service priority, ensuring the assignment effect of the proposal right, and ensuring orderly proceeding of blockchain-based data processing.

In one embodiment, the bidding resources corresponding to the amount of bidding resources include at least one of physical resources, virtual goods or the amount of service data to be deposited.

The bidding resources corresponding to the amount of bidding resources may be configured according to the actual needs, including but not limited to physical resources, virtual goods or the amount of service data to be deposited. Different bidding resources are configured to be applied to different application scenarios, thus extending the application scenarios of blockchain-based data processing method.

In one embodiment, the first representative node and the second representative node are different representative nodes. The obtaining the bidding result information of the next block to be on-chained includes: receive the bidding information for the next block to be on-chained, submitted by the second representative node, during reaching a consensus on a block at the end position of the blockchain, the bidding information being used for requesting the proposal right of the next block to be on-chained; perform consensus check on the bidding information; and receive the bidding result information broadcast by a consensus committee.

The end position refers to the position where the block on-chained at last is in the blockchain. For example, if there are M blocks in the blockchain, the block at the end position in the blockchain is the M block. Specifically, the first representative node receives the bidding information for the M+1 block submitted by the second representative node during reaching a consensus on the M block on the blockchain, the bidding information being used for requesting the proposal right of the M+1 block. The first representative node performs consensus check on the bidding information, receives the bidding result information broadcast by the consensus committee (other representative nodes than the first representative node), and determines the bidding result information with the highest repetition rate as the final bidding result information. For example, assuming that in the bidding result information obtained by the first representative node, the repetition rate of the bidding result information 1 generated from the bidding information 1 is 95%, the repetition rate of the bidding result information 2 generated from the bidding information 2 is 3%, and the repetition rate of the bidding result information 3 generated from the bidding information 3 is 2%, the first representative node will determine the bidding result information 1 generated from the bidding information 1 as the final bidding result information.

In this embodiment, in response to that the first representative node and the second representative node are different representative nodes, the bidding information of the second representative node is received by the first representative node, and the broadcast bidding result information is received after consensus check is performed based on the bidding information, thereby ensuring that the obtained bidding result information is broadcast by the second representative node having the proposal right, and ensuring the accuracy of the bidding result information.

In another embodiment, the first representative node and the second representative node are the same representative node. The obtaining the bidding result information of the next block to be on-chained includes: submit the bidding information for the next block to be on-chained to the consensus committee during reaching a consensus on a block at the end position of the blockchain, the bidding information being used for requesting the proposal right of the next block to be on-chained; perform consensus check on the bidding information; and receive the bidding result information broadcast by a consensus committee.

The end position refers to the position where the block on-chained at last is in the blockchain. Specifically, the first representative node submits the bidding information for the M+1 block to the consensus committee during reaching a consensus on the M block on the blockchain, the bidding information being used for requesting the proposal right of the M+1 block. The first representative node performs consensus check on the bidding information, receives the bidding result information broadcast by the consensus committee (other representative nodes than the first representative node), and determines the bidding result information with the highest repetition rate as the final bidding result information.

In this embodiment, in response to that the first representative node and the second representative node are the same representative node, directly after consensus check is performed on the bidding information submitted by the first representative node, the broadcast bidding result information is received, thereby ensuring that the obtained bidding result information is broadcast by the first representative node having the proposal right, and ensuring the accuracy of the bidding result information.

S302. Generate the on-chaining indication information of the next block to be on-chained according to the bidding result information.

In one implementation, the first representative node determines the second representative node (i.e., the representative node having the proposal right of the M+1 block) according to the bidding result information, and generates the on-chaining indication information of the M+1 block according to the bidding information broadcast by the second representative node. For example, the first representative node may directly use the bidding information broadcast by the second representative node as the on-chaining indication information of the M+1 block. The first representative node may also extract some data from the bidding information broadcast by the second representative node (e.g., the identifiers of service parties related to the M+1 block, the amount of service data to be deposited by each service party, and the like), and generate the on-chaining indication information of the M+1 block according to the extracted data. In this embodiment, the on-chaining indication information is generated according to the bidding result information of the next block to be on-chained. Specifically, using the bidding information for the next block to be on-chained in the blockchain submitted by the second representative node indicated by the bidding result information, the on-chaining instruction information of the next block to be on-chained may be accurately obtained, so as to accurately determine the type of the next block to be on-chained.

In one embodiment, the generating the on-chaining indication information of the next block to be on-chained according to the bidding result information includes: extract bidding information from the bidding result information;

and generate the on-chaining indication information of the next block to be on-chained according to the extracted bidding information.

Specifically, the bidding result information carries the bidding information. A computer device extracts the bidding information from the obtained bidding result information and generates the on-chaining indication information of the next block to be on-chained based on the obtained bidding information, and further determine the type of the next block to be on-chained through the on-chaining indication information. In this embodiment, the bidding information is extracted from the bidding result information to generate the on-chaining indication information, thereby determining the type of the next block to be on-chained according to the bidding information submitted by the second representative node having the proposal right, and ensuring orderly processing of the next block to be on-chained.

S303. Obtain a target block waiting for consensus in a blockchain network.

In one implementation, the first representative node and the second representative node are different representative nodes, and the first representative node obtains the target block waiting for consensus broadcast by the second representative node.

In another implementation, the first representative node and the second representative node are the same representative node, and the first representative node obtains cross-chain service data of all service parties of target service from a resource pool in the blockchain network, and generates a target block according to the cross-chain service data of all service parties.

Specifically, during reaching a consensus on the M block, the first representative node determines whether bidding transaction result information is packed in the M block. In response to that the bidding transaction result information is packed in the M block, on-chaining indication information of the M+1 block is generated according to the bidding transaction result information. The first representative node obtains cross-chain service data of all service parties of the target service from a resource pool in the blockchain network, and generates a target block, thereby achieving efficient processing of the cross-chain service data.

In response to that the on-chaining indication information of the M+1 block indicates that the M+1 block is of an exclusive type, the M+1 block may only store exclusive service data and common service data related to the representative node indicated by the bidding transaction result information (exclusive service data is stored first, and then the target block is filled with common service data (so that the amount of service data in the M+1 block is consistent with the amount indicated by the on-chaining indication information)).

In some embodiments, a bidding resource deduction service is added for the M+1 block, and the deduction service is packed with service data into a target block.

In response to that the on-chaining indication information of the M+1 block indicates that the M+1 block is of a coexclusive type, the M+1 block may only store coexclusive service data related to the cross-chain service indicated by the bidding transaction result information.

In response to that the on-chaining indication information of the M+1 block indicates that the M+1 block is of a common type, the M+1 block is used for storing common service data in a resource pool, as well as global configuration updates on the blockchain and other transactions.

It is to be understood that in response to that T consecutive blocks are of an exclusive or coexclusive type on the blockchain, the smart contract is changed, and the changed smart contract is used for determining the type of the target block as a common type (i.e., after T consecutive exclusive or coexclusive blocks are generated in the blockchain, it is necessary to generate a common block), T being a positive integer.

The resource pool may include service data of the following three types: (1) Exclusive service data: Exclusive service data may only be stored in exclusive blocks. (2) Coexclusive service data: Coexclusive service data may only be stored in coexclusive blocks. The coexclusive blocks are used for storing coexclusive service data related to cross-chain service jointly participated by 2 to N service parties. The coexclusive service data related to the cross-chain service may be a specially marked service data. The service data carries the identifiers of blockchain sub-chains (private chains maintained by consensus clusters) of parties involved in the cross-chain service, and the identifiers of all service parties (e.g., the addresses of all service parties, the signature information of all service parties, and the like). (3) Common service data: Common service data may be stored in both common blocks and exclusive blocks. In case of being put in exclusive blocks, the priority of common service data is lower than that of exclusive service data.

S304. Perform consensus check on the target block according to consensus rules for the coexclusive type in response to that the on-chaining indication information indicates that the next block to be on-chained is of a coexclusive type.

The performing consensus check on the target block according to consensus rules for the coexclusive type includes: the first representative node performs legitimacy check on the target block according to the on-chaining indication information, and the consensus committee determines the final consensus check result based on vote.

The performing consensus check on the target block according to consensus rules for the coexclusive type may include one or more of the following implementations:

In one implementation, the target block is related to target service, and is used for storing cross-chain service data of the target service. The performing consensus check on the target block according to consensus rules for the coexclusive type includes: check whether the target service is independent cross-chain service; and determine that the target block passes the consensus check in response to that the target service is independent cross-chain service.

A computer device of the first representative node checks whether the target service is independent cross-chain service. Specifically, the computer device of the first representative node may check whether the service data of the target service is coexclusive service data. In response to that the service data of the target service is not coexclusive service data, it is determined that the target service is not independent cross-chain service, and the target block does not pass the consensus check. In response to that the service data of the target service is coexclusive service data, it is determined that the target block passes the consensus check and may be added to a blockchain.

Further, in case of determining that the service data of the target service is coexclusive service data, the computer device may also check whether the identifiers of service parties of the target service carried in the service data of the target service match. In response to that the identifiers of the service parties of the target service carried in the service data of the target service match, it is determined that the target service is independent cross-chain service, and the target block passes the consensus check. In response to that the identifiers of the service parties of the target service carried in the service data of the target service do not match, it is determined that the target service is not independent cross-chain service, and the target block does not pass the consensus check. For example, assuming that the target service is participated by a service party A and a service party B, in response to that the service data of the service party A carries the identifiers of the service party B (and the service party A), and the service data of the service party B carries the identifiers of the service party A (and the service party B), it is determined that the target service is independent cross-chain service, and the target block passes the consensus check. Accordingly, in response to that the service data of a service party A carries the identifiers of service parties other than (the service party A and) a service party B (e.g., the service data of the service party A carries the identifier of a service party C), or the service data of the service party B carries the identifiers of service parties other than the service party A (and the service party B) (e.g., the service data of the service party B carries the identifier of a service party D), it is determined that the target service is not independent cross-chain service, and the target block does not pass the consensus check.

In this embodiment, the computer device checks the target service related to a target block to determine whether the target service is independent cross-chain service, thereby implementing check of the target block, ensuring that the target block meets the service conditions of the next block to be on-chained, and ensuring the accuracy of the next block added to the blockchain.

In another implementation, the target block is related to the target service, and the target block stores the identifiers of multiple service parties participating in the target service. on-chaining indication information is also used for indicating the identifiers of multiple coexclusive parties of the next block to be on-chained. The performing consensus check on the target block according to consensus rules for the coexclusive type includes: check whether the identifiers of the multiple service parties in the target block are consistent with the identifiers of the multiple coexclusive parties of the next block to be on-chained; and determine that the target block passes the consensus check in response to that the identifiers of the multiple service parties in the target block are consistent with the Identifiers of the multiple coexclusive parties of the next block to be on-chained.

Specifically, a first representative node checks whether the identifiers of the multiple service parties in the target block are the same as the identifiers of multiple coexclusive parties in the next block to be on-chained. In response to that there are M blocks in the blockchain, specifically it may be determined whether the identifiers of the multiple service parties in the target block are the same as the identifiers of multiple coexclusive parties of the M+1 block. The target block passes the consensus check in response to that the identifiers of the multiple service parties in the target block are the same as the identifiers of the multiple coexclusive parties of the M+1 block. The target block does not pass the consensus check in response to that the identifiers of the multiple service parties in the target block are not the same as the identifiers of the multiple coexclusive parties of the M+1 block. For example, in response to that the target block stores the identifiers of a service party 1 and a service party 2 participating in the target service, and the on-chaining indication information indicates that the identifiers of the coexclusive parties of the M+1 block are the identifiers of the service party 1 and the service party 2, the first representative node determines that the target block passes the consensus check, and the target block may be added to the blockchain.

In this embodiment, the computer device checks the identifiers of service parties of the target service related to a target block, to determine whether the identifiers of the multiple service parties in the target block are the same as the identifiers of the multiple coexclusive parties of the next block to be on-chained, thereby implementing check of the target block, ensuring that the target block meets the service party conditions of the next block to be on-chained, and ensuring the accuracy of the next block added to the blockchain.

In an embodiment, the target block also stores service data to be deposited of each of multiple service parties. on-chaining indication information is also used for indicating the occupation amount of each of multiple coexclusive parties. After checking that the identifiers of the multiple service parties in the target block are the same as the identifiers of the multiple coexclusive parties of the next block to be on-chained, the consensus check further includes: obtain the amount of service data to be deposited of each service party in the target block; check whether the amount of the service data to be deposited of each service party matches the corresponding occupation amount of each coexclusive party; and continue to determine whether the target block passes the consensus check in response to that the amount of service data to be deposited of each service party matches the corresponding occupation amount of each coexclusive party.

Specifically, a first representative node obtains the amount of service data to be deposited of each service party in the target block (e.g., count the amount of service data to be deposited of each service party in the target block), and checks whether the amount of service data to be deposited of each service party matches the occupation amount of each corresponding coexclusive party (e.g., check whether the amount of service data to be deposited of each service party in the target block is the same as the occupation amount of each corresponding coexclusive party). In response to that the amount of the service data to be deposited of each service party matches the corresponding occupation amount of each coexclusive party, the target block passes the consensus check. In response to that the amount of the service data to be deposited of at least one service party does not match the occupation amount of the corresponding coexclusive party, it is determined that the target block does not pass the consensus check. For example, assuming that there are two pieces of service data to be deposited of a service party 1 and one piece of service data to be deposited of a service party 2 in the target block, and the on-chaining indication information indicates that the occupation amount of the service party 1 is 2, and the occupation amount of the service party 2 is 1, the first representative node determines that the target block passes the consensus check.

In this embodiment, the computer device checks the amount of service data to be deposited of each service part stored in the target block, to determine whether the amount of the service data to be deposited of each service party in the target block matches the occupation amount of each coexclusive party of the next block to be on-chained, thereby implementing check of the target block, ensuring that the target block meets the amount condition for the service data to be deposited in the next block to be on-chained, and ensuring the accuracy of the next block added to the blockchain.

In another implementation, a target block is related to target service, the target service is participated by multiple service parties, and one service party refers to one consensus cluster in a consensus subnet. The target block further stores the service data to be deposited of each of the multiple service parties. Each service party maintains a blockchain sub-chain (i.e., each consensus cluster maintains a private chain for storing service data in the consensus cluster). The performing consensus check on the target block according to consensus rules for the coexclusive type includes: check whether the service data to be deposited of each service party in the target block is stored in the blockchain sub-chain of each service party; and determine that the target block passes the consensus check in response to that the service data to be deposited of each service party in the target block is stored in the blockchain sub-chain of each service party.

Specifically, a first representative node checks whether the service data to be deposited of each service party in the target block is stored in the respective blockchain sub-chain of each service party (e.g., the first representative node sends confirmation information to each service party to confirm that the service data to be deposited of each service party is stored in the respective blockchain sub-chain of each service party). It is determined that the target block passes the consensus check in response to that the service data to be deposited of each service party in the target block is stored in the blockchain sub-chain of each service party. It is determined that the target block does not pass the consensus check in response to that the service data to be deposited of at least one service party in the target block is not stored in the blockchain sub-chain of the service party.

In this embodiment, the computer device checks whether the service data to be deposited in the target block is stored in the respective blockchain sub-chain of each service party, ensures that the corresponding service data to be deposited is stored in the respective blockchain sub-chain of each service party, ensures that the target block meets the sub-chain storage condition for the service data to be deposited in the next block to be on-chained, and ensures the accuracy of the next block added to the blockchain.

S305. Add the target block to the blockchain as the next block to be on-chained in response to that the target block passes the consensus check.

The M+1 block carries the type identifier of the block and the identifiers of service parties related to the M+1 block. In a specific implementation, a process of adding a new block to a blockchain is as follows:

(1) a second representative node of the M+1 block generates a target block waiting for consensus;
(2) the second representative node of the M+1 block broadcasts the target block waiting for consensus to other representative nodes in the consensus committee than the second representative node;
(3) the representative nodes in the consensus committee check the target block waiting for consensus, and broadcast their check results to other representative nodes in the consensus committee (e.g., for voting to support the check results approved thereby);
(4) each representative node in the consensus committee collects the votes of other representative nodes in the consensus committee, and broadcasts the collected voting results greater than a proportion threshold (e.g., 2/3);
(5) each representative node in the consensus committee collects the voting results of other representative nodes in the consensus committee. In response to that the proportion of votes obtained by the check result that the target block waiting for consensus passes the check is greater than the proportion threshold (e.g., 2/3), it is indicated that the target block waiting for consensus passes the consensus check; and
(6) the target block is regarded as the M+1 block in the blockchain, and a second representative node corresponding to the M+2 block is determined according to bidding result information obtaining a consensus.

Figure 4:
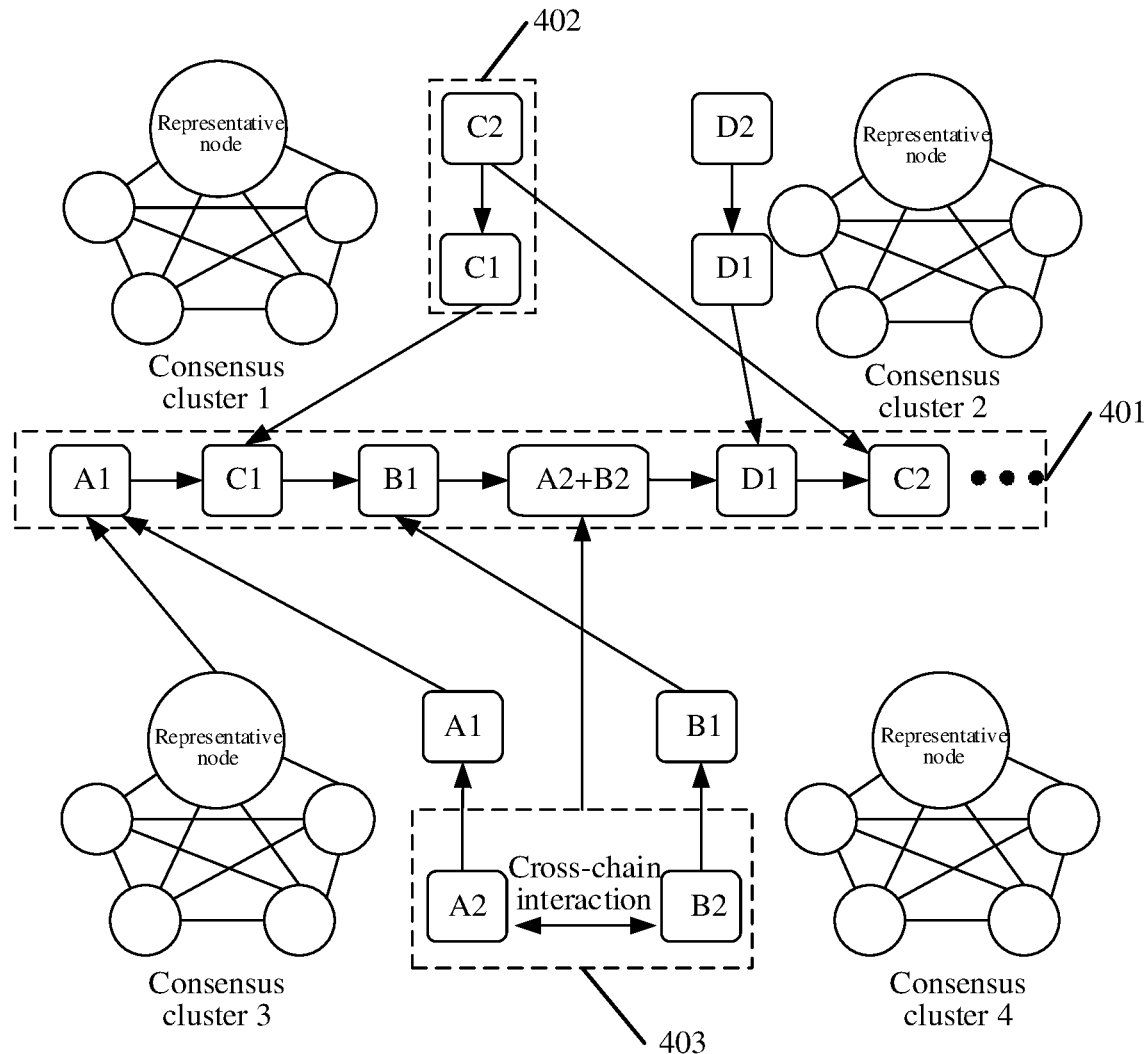
FIG. 4 shows a schematic diagram of a blockchain-based data processing scenario provided by an exemplary embodiment of the present disclosure.

FIG. 4 shows a schematic diagram of a blockchain-based data processing scenario provided by an exemplary embodiment of the present disclosure. To introduce in more detail the implementation of the blockchain-based data processing method provided by the present disclosure, the following is a brief introduction with reference to FIG. 4. As shown in FIG. 4, a consensus subnet includes N consensus clusters, N being an integer greater than 1. All consensus clusters contained in the consensus subnet may elect one accounting node as a representative node, and N representative nodes form a consensus committee. The consensus committee maintains a blockchain 401 of the consensus subnet, and the blockchain 401 is the main chain in a blockchain network. N consensus clusters may bid for the proposal right of the blockchain network. After a consensus cluster obtains the proposal right, the consensus cluster having the proposal right is responsible for generating a target block waiting for consensus, a representative node of the consensus cluster having the proposal right is responsible for broadcasting the target block waiting for consensus to each representative node in the consensus committee, and the consensus committee may perform consensus processing. For example, a block A1 in the blockchain 401 is broadcast by a representative node in a consensus cluster 3 to the representative nodes in the consensus committee. For another example, a block C1 in the blockchain 401 is broadcast by a representative node in a consensus cluster 1 to the representative nodes in the consensus committee. In this way, the service data of the entire consensus subnet may be recorded in the blockchain maintained by the consensus committee, facilitating the management and review of the service data provided by different consensus clusters in the entire consensus subnet.

Of course, each consensus cluster may also maintain its own blockchain sub-chain which only contains its own service blocks, facilitating the consensus cluster to manage its own service data. In a specific implementation, in response to that a new block is generated in a consensus cluster, the new block may anchor the previous block generated in the consensus cluster and realize organization of a blockchain sub-chain of the consensus cluster. As shown in FIG. 4, a consensus cluster 1 may organize its own blockchain sub-chain 402. The blockchain sub-chain 402 includes a block C1 and a block C2 that are generated in the consensus cluster 1. In response to that the block C2 is generated in the consensus cluster 1, the block C2 may anchor the previous block C1 of the blockchain sub-chain 401 in the consensus cluster 1, that is, the block C2 records the hash value (subprehash), i.e., the hash value of block C1, of the previous block C1 of the blockchain sub-chain 402 in the consensus cluster 1. In response to that the block C2 is submitted by a representative node to the blockchain 401 of the consensus subnet for performing consensus processing, the block C2 may also anchor the previous block in the blockchain 401. At this time, the hash value (prehash) of a block D1 in the blockchain 401, i.e., the hash value of the block D1, is recorded in the block 2. Based on the above description, each consensus cluster may organize its own blockchain sub-chain through the subprehash in the block to facilitate management of service data in the cluster. The consensus committee may maintain the blockchain of the entire consensus subnet, facilitating unified management and review of service data of the entire consensus subnet.

Further, the consensus clusters in the consensus subnet may also conduct cross-chain interaction (i.e., perform cross-chain service). Specifically:

(1) accounting nodes in each consensus cluster support accounting nodes in other consensus clusters to initiate a cross-chain request thereto (e.g., cross-chain service data interaction).

(2) A service smart contract corresponding to the cross-chain request is registered in the accounting nodes of each consensus cluster in advance.

(3) After the accounting nodes of at least two consensus clusters establish connection, the cross-chain service is called. During the call process, the service data related to the cross-chain service generated is packed into blocks of the blockchain sub-chain in each consensus cluster. As shown in FIG. 4, A2 is the block of the blockchain sub-chain packed in the consensus cluster 3, and B2 is the block of the blockchain sub-chain packed in the consensus cluster 4. Coexclusive blocks may only store coexclusive service data related to cross-chain service (e.g., service data in A2 and B2). It is to be understood that the cross-chain interaction between the consensus cluster 3 and the consensus cluster 4 is independent cross-chain service. Coexclusive service data related to the independent cross-chain service may only be put into a single coexclusive block. Coexclusive service data related to multiple independent cross-chain services cannot be mixed and packed together.

(4) In the same way as (3), in case of bidding for a coexclusive block, each representative node will bid for a coexclusive block for each independent cross-chain service generated.

(5) Since cross-chain service involves multi-party confirmation, as shown in FIG. 4, after the consensus cluster 3 adds A2 to the blockchain sub-chain maintained thereby, and the consensus cluster 4 adds B2 to the blockchain sub-chain maintained thereby, the consensus cluster 3 and the consensus cluster 4 need to wait until an A2+B2 block on the blockchain main chain passes consensus check before they can continue to add new blocks to the blockchain sub-chains maintained thereby.

Taking the processed service as invoice service as an example, a consensus algorithm is bound with blockchain electronic invoice processing logic. Each invoicing institution (local tax bureaus in different provinces and cities) obtains the opportunity of block creation by broadcasting bidding information to a consensus committee. In a process of reaching a consensus on the N block of the blockchain, who will bid for and obtain the N+1 block is determined. After accumulating a certain amount of service data (invoicing data), representative nodes (e.g., SPV nodes) from different tax bureaus broadcast bidding information to the consensus committee to bid for an exclusive block. The consensus committee determines which representative node has the proposal right for the next block based on the bidding information of each representative node. The representative node that has obtained the proposal right for the next block and obtained an exclusive block pays a certain amount of bidding resources based on the waiting time (the waiting time weight and bidding resource solution may be designed based on actual needs). The exclusive block will pack all exclusive service data (invoicing data) related to the representative node and common service data (invoicing data).

In this embodiment of the present disclosure, by bidding for an exclusive block, the service data of a single consensus cluster (corresponding institution) may be on-chained in batch, and the exclusive block may allow a single representative node to store the related service data in a single block for the convenience of further check and audit. Exclusive blocks may better isolate service data of different representative nodes and better protect privacy. Also, during searching for service data, unrelated blocks may be quickly skipped through the blockchain sub-chain maintained by each consensus cluster, improving efficiency and query efficiency. In addition, the bidding method may effectively meet the needs of representative nodes that are to on-chain a large amount of service data as soon as possible. The required bidding resources are calculated as a whole by means of the waiting time, ensuring the overall efficiency and fairness of the blockchain network. For a data processing solution corresponding to cross-chain service, the present disclosure not only provides a feasible multi-service party interaction solution, but also ensures the independence of each piece of cross-chain service data through coexclusive blocks, and the blockchain sub-chain maintained by each consensus cluster may effectively synchronize cross-chain data related thereto. Practice has proven that this solution has good scalability and is suitable for scenarios where there are multiple consensus clusters in a blockchain network and different cross-chain services are continuously added.

The method of this embodiment of the present disclosure is described in detail above. In order to better implement the above solution of this embodiment of the present disclosure, the apparatus of this embodiment of the present disclosure is provided below.

Figure 5:
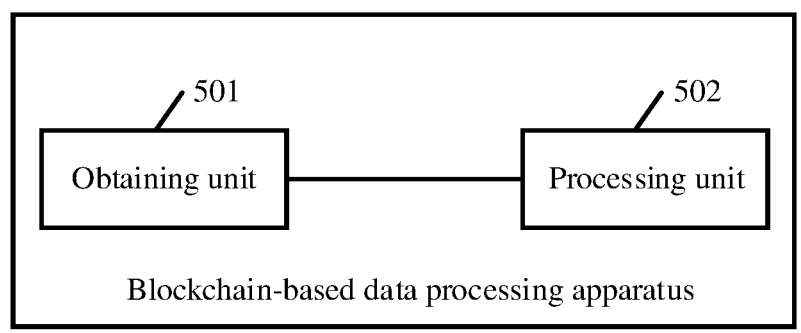
FIG. 5 shows a structure diagram of a blockchain-based data processing apparatus provided by an exemplary embodiment of the present disclosure.

FIG. 5 shows a structure diagram of a blockchain-based data processing apparatus provided by an exemplary embodiment of the present disclosure, and the apparatus may be carried on the representative node shown in FIG. 1e. The blockchain-based data processing apparatus shown in FIG. 5 may be configured to perform some or all of the functions in the method embodiments described in FIG. 2 and FIG. 3 above, where the blockchain contains at least one block; the blockchain is located in a blockchain network including a witness subnet and a consensus subnet, the witness subnet contains at least one service node, and the consensus subnet contains at least two consensus clusters; each consensus cluster includes multiple accounting nodes, and each consensus cluster elects one accounting node in its own consensus cluster as a representative node; and the representative nodes of all consensus clusters form a consensus committee of the blockchain. The data processing apparatus may be carried in a first representative node in the consensus committee, the first representative node being any representative node in the consensus committee. Referring to FIG. 5, the detailed description of each unit is as follows:

an obtaining unit 501, configured to obtain on-chaining indication information of a blockchain, the on-chaining indication information being used for indicating the type of a next block to be on-chained, and obtain a target block waiting for consensus in a blockchain network, the target block being generated according to cross-chain service data; and a processing unit 502, configured to add the target block to the blockchain as the next block to be on-chained in response to that the on-chaining indication information indicates that the next block to be on-chained is of a coexclusive type, the coexclusive block being used for storing independent cross-chain service.

In one embodiment, the processing unit 502 is further configured to perform consensus check on the target block according to consensus rules for the coexclusive type in response to that the on-chaining indication information indicates that the next block to be on-chained is of a coexclusive type, and add the target block to the blockchain as the next block to be on-chained in response to that the target block passes the consensus check.

In one implementation, the target block is related to target service, and is used for storing cross-chain service data of the target service. The processing unit 502 is further configured to check whether the target service is independent cross-chain service, and determine that the target block passes the consensus check in response to that the target service is independent cross-chain service.

In one implementation, the target block is related to the target service, and the target block stores the identifiers of multiple service parties participating in the target service. on-chaining indication information is also used for indicating the identifiers of multiple coexclusive parties of the next block to be on-chained. The processing unit 502 is further configured to check whether the identifiers of the multiple service parties in the target block are the same as the identifiers of the multiple coexclusive parties of the next block to be on-chained, and determine that the target block passes the consensus check in response to that the identifiers of the multiple service parties in the target block are the same as the identifiers of the multiple coexclusive parties of the next block to be on-chained.

In one implementation, the target block also stores service data to be deposited of each of multiple service parties. on-chaining indication information is also used for indicating the occupation amount of each of multiple coexclusive parties. The processing unit 502 is further configured to obtain the amount of service data to be deposited of each service party in the target block, check whether the amount of the service data to be deposited of each service party matches the corresponding occupation amount of each coexclusive party, and continue to determine whether the target block passes the consensus check in response to that the amount of service data to be deposited of each service party matches the corresponding occupation amount of each coexclusive party.

In one implementation, a target block is related to target service, the target service is participated by multiple service parties, and one service party refers to a consensus cluster in a consensus subnet. The target block further stores the service data to be deposited of each of the multiple service parties. Each service party maintains a blockchain subchain. The processing unit 502 is further configured to check whether the service data to be deposited of each service party in the target block is stored in the blockchain sub-chain of each service party, and determine that the target block passes the consensus check in response to that the service data to be deposited of each service party in the target block is stored in the blockchain sub-chain of each service party.

In one implementation, the obtaining unit 501 is further configured to obtain bidding result information of the next block to be on-chained to a blockchain, the bidding result information being used for indicating a second representative node that obtains the proposal right of the next block to be on-chained, and the bidding information for the next block to be on-chained submitted by the second representative node; and generate the on-chaining indication information of the next block to be on-chained according to the bidding result information.

In one implementation, the obtaining unit 501 is further configured to receive the bidding information for the next block to be on-chained, submitted by the second representative node, during reaching a consensus on a block at the end position of the blockchain, the bidding information being used for requesting the proposal right of the next block to be on-chained; perform consensus check on the bidding information; and receive the bidding result information broadcast by a consensus committee.

In one implementation, in response to that the first representative node and the second representative node are the same representative node, the obtaining unit 501 is further configured to submit the bidding information for the next block to be on-chained to the consensus committee during reaching a consensus on a block at the end position of the blockchain, the bidding information being used for requesting the proposal right of the next block to be on-chained; perform consensus check on the bidding information; and receive the bidding result information broadcast by a consensus committee.

In one implementation, the obtaining unit 501 is further configured to extract bidding information from the bidding result information, and generate the on-chaining indication information of the next block to be on-chained according to the extracted bidding information.

In an embodiment, the bidding information includes at least one of the amount of service data to be packed in the next block to be on-chained, the identifiers of service parties related to the service data, and the type of the service data.

In one embodiment, the bidding information includes the waiting time and the amount of bidding resources. The bidding result information is generated after the consensus committee performs consensus check on the bidding information based on the waiting time and the amount of bidding resources in the bidding information, and the consensus check of the bidding information is successful.

In one embodiment, the bidding resources corresponding to the amount of bidding resources include at least one of physical resources, virtual goods or the amount of service data to be deposited.

In one implementation, a target block is related to target service, and the target service is participated by multiple service parties. In response to that the first representative node and the second representative node are the same representative node, the processing unit 502 is further configured to obtain cross-chain service data of all service parties of target service from a resource pool in the blockchain network, and generate a target block according to the cross-chain service data of all service parties.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

According to an embodiment of the present disclosure, some of the steps involved in the blockchain-based data processing method shown in FIGS. 2 and 3 may be performed by the units in the blockchain-based data processing apparatus shown in FIG. 5. For example, the steps S201 and S202 shown in FIG. 2 may be performed by the obtaining unit 501 shown in FIG. 5, and the step S203 may be performed by the processing unit 502 shown in FIG. 5. The steps S301 and S303 shown in FIG. 3 may be performed by the obtaining unit 501 shown in FIG. 5, and the steps S302, S304, and S305 may be performed by the processing unit 502 shown in FIG. 5. The units in the blockchain-based data processing apparatus shown in FIG. 5 may be separately or completely combined into one or several other units, or one or more of the units may be divided into functionally smaller multiple units, which may achieve the same operation without affecting the implementation of the technical effects of this embodiment of the present disclosure. The above units are divided based on logical functions. In practical applications, the functions of one unit may also be implemented by multiple units, or the functions of multiple units may be implemented by one unit. In other embodiments of the present disclosure, the blockchain-based data processing apparatus may also include other units. In practical applications, these functions may also be implemented with the assistance of other units, and may be implemented by multiple units in collaboration.

According to another embodiment of the present disclosure, a computer program (including program code), capable of performing the steps involved in the corresponding methods shown in FIGS. 2 and 3, may be run on a general-purpose computing apparatus, e.g., a computer including processing elements and memory elements such as a central processing unit (CPU), a random-access memory (RAM), and a read-only memory (ROM), to construct the blockchain-based data processing apparatus shown in FIG. 5, and implement the blockchain-based data processing method of this embodiment of the present disclosure. The computer program may be recorded on, for example, a computer-readable recording medium, and loaded into and run in the computing apparatus described above through the computer-readable recording medium.

In this embodiment of the present disclosure, by bidding for an exclusive block, the service data of a single consensus cluster (corresponding institution) may be on-chained in batch, and the exclusive block may allow a single representative node to store the related service data in a single block for the convenience of further check and audit. Exclusive blocks may better isolate service data of different representative nodes and better protect privacy. Also, during searching for service data, unrelated blocks may be quickly skipped through the blockchain sub-chain maintained by each consensus cluster, improving efficiency and query efficiency. In addition, the bidding method may effectively meet the needs of representative nodes that are to on-chain a large amount of service data as soon as possible. The required bidding resources are calculated as a whole by means of the waiting time, ensuring the overall efficiency and fairness of the blockchain network. For a data processing solution corresponding to cross-chain service, the present disclosure not only provides a feasible multi-service party interaction solution, but also ensures the independence of each piece of cross-chain service data through coexclusive blocks, and the blockchain sub-chain maintained by each consensus cluster may effectively synchronize cross-chain data related thereto. Practice has proven that this solution has good scalability and is suitable for scenarios where there are multiple consensus clusters in a blockchain network and different cross-chain services are continuously added.

Figure 6:
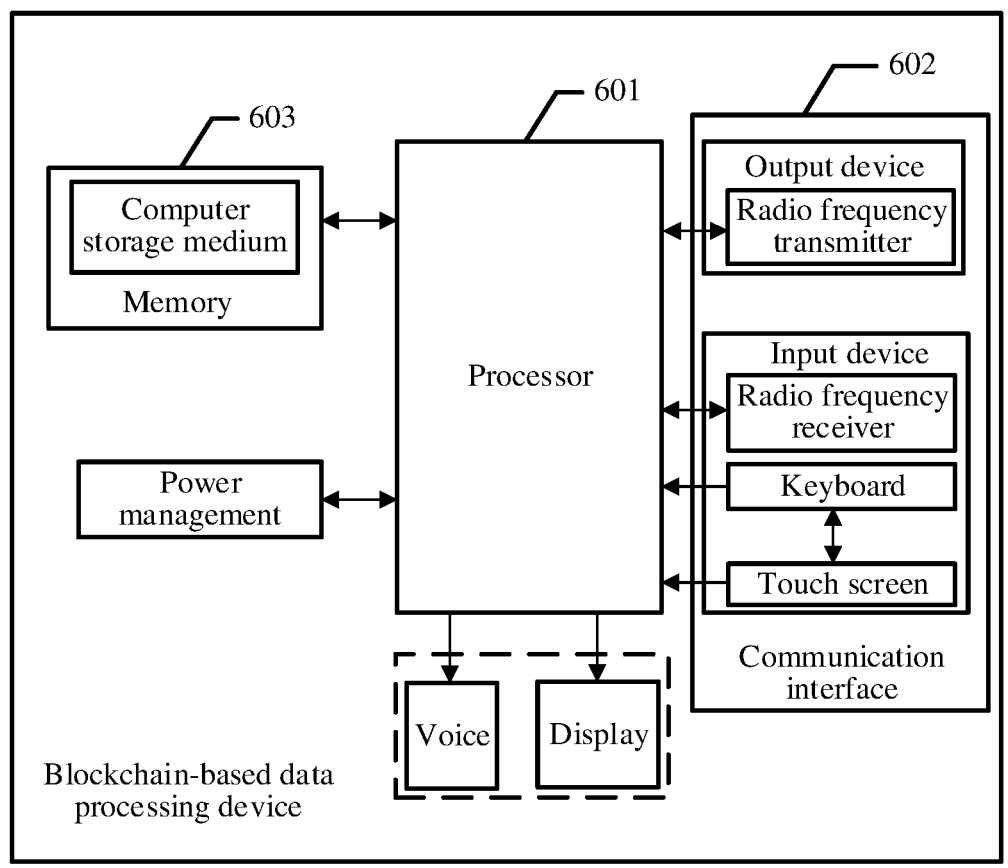
FIG. 6 shows a structure diagram of a blockchain-based data processing device provided by an exemplary embodiment of the present disclosure.

FIG. 6 shows a structure diagram of a blockchain-based data processing device provided by an exemplary embodiment of the present disclosure. As shown in FIG. 6, the blockchain-based data processing device includes at least a processor 601, a communication interface 602 and a memory 603. The processor 601, the communication interface 602 and the memory 603 may be connected via a bus or other means. The processor 601 (or Central Processing Unit, CPU) is the computing and control core of a terminal, which may parse various instructions in the terminal and process various data of the terminal, for example, the CPU may be configured to parse on-off instructions sent by a user to the terminal and control the terminal to perform on-off operations; and for another example, the CPU may transmit various types of interactive data between the internal structures of the terminal; and so on. The communication interface 602 may include a standard wired interface, a wireless interface (e.g., WI-FI, a mobile communication interface, and the like), and may be configured to receive and transmit data under the control of the processor 601. The communication interface 602 may also be used for transmission and interaction of data within the terminal. The memory 603 is a memory device in the terminal and is configured to store programs and data. It is understood that the memory 603 herein may include a built-in memory of the terminal, or an extended memory supported by the terminal. The memory 603 provides a memory space for storing the operating system of the terminal, which may include, but is not limited to: Android systems, iOS systems, Windows Phone systems, and the like, which is not limited in the present disclosure.

An embodiment of the present disclosure further provides a computer-readable storage medium (Memory) which is a memory device in a terminal for storing computer-readable instructions and data. It is understood that the computer-readable storage medium herein may include a built-in storage medium in a terminal, or an extended storage medium supported by the terminal. The computer-readable storage medium provides a storage space for storing the processing system of the terminal. In addition, one or more computer-readable instructions to be loaded and executed by the processor 601 are also stored in the storage space, and the computer-readable instructions may be one or more computer programs (including program code). It is to be understood that the computer-readable storage medium herein may be a high-speed RAM or non-volatile memory, e.g., at least one disk memory. In some embodiments, the computer-readable storage medium may also be at least one computer-readable storage medium located away from the aforementioned processor.

In one embodiment, the computer-readable storage medium stores one or more computer readable instructions. The processor 601 loads and performs the one or more computer-readable instructions stored in the computer-readable storage medium to implement the corresponding steps in the embodiment of the blockchain-based data processing method described above.

This embodiment of the present disclosure further provides a non-volatile computer-readable storage medium having stored therein computer-readable instructions, and one or more computer-readable instructions are stored in the computer-readable storage medium and are to be loaded by a processor and execute the blockchain-based data processing method described in the above embodiment.

An embodiment of the present disclosure further provides a computer program product containing instructions that, when run on a computer, cause the computer to execute the blockchain-based data processing method described in the above embodiment.

An embodiment of the present disclosure further provides a computer program product or computer program that includes computer-readable instructions stored in a computer-readable storage medium. The processor of a computer device reads the computer-readable instructions from the computer-readable storage medium, and the processor executes the computer-readable instructions to enable the computer device to execute the blockchain-based data processing method described above.

The steps in the method of this embodiment of the present disclosure may be sequentially adjusted, combined and deleted according to practical needs. The modules in the apparatus of this embodiment of the present disclosure may be combined, divided and deleted according to actual needs. Those skilled in the art may understand that all or part of the steps in various methods of the above embodiments may be completed by instructing related hardware through a program, and the program may be stored in a computer-readable storage medium including: flash drives, Read-Only Memories (ROMs), Random Access Memories (RAMs), magnetic disks, optical disks, and the like.

The above disclosure is only a preferred embodiment of the present disclosure, and certainly cannot be used to limit the scope of rights of the present disclosure. Those skilled in the art may understand all or part of the process for implementing the above embodiments, and equivalent changes made in accordance with the claims of the present disclosure still fall within the scope of the present disclosure.

What is claimed is:

1. A data processing method based on a blockchain, wherein the blockchain comprises at least one block and is located in a blockchain network comprising a witness subnet and a consensus subnet, the witness subnet contains at least one service node, and the consensus subnet contains at least two consensus clusters; a consensus cluster comprises multiple accounting nodes, and one accounting node is elected in its own consensus cluster as a representative node; representative nodes of the at least two consensus clusters form a consensus committee of the blockchain; the method is implemented by a first representative node of the representative nodes in the consensus committee; and the method comprises:
   obtaining bidding result information of a next block to be on-chained, the bidding result information indicating a second representative node having a proposal right of the next block and bidding information for the next block submitted by the second representative node; and
   generating on-chaining indication information of the next block of the blockchain according to the bidding result information, the on-chaining indication information indicating a type of a next block to be on-chained;
   obtaining a target block waiting for consensus in the blockchain network, the target block being generated according to cross-chain service data; and
   adding the target block to the blockchain as the next block in response to that the on-chaining indication information indicates that the next block is of a coexclusive type, wherein a block of the coexclusive type is configured to store data of an independent cross-chain service,
   wherein:
   the bidding information comprises waiting time and an amount of bidding resources, the waiting time being a duration waited by the second representative node from a time of requesting the proposal right to a time of obtaining the proposal right; and
   the bidding result information is generated after the consensus committee performs consensus check on the bidding information based on the waiting time and the amount of bidding resources in the bidding information, and the consensus check of the bidding information is successful.

2. The method according to claim 1, wherein the adding the target block to the blockchain as the next block in response to that the on-chaining indication information indicates that the next block is of a coexclusive type comprises:
   performing consensus check on the target block according to consensus rules for the coexclusive type in response to that the on-chaining indication information indicates that the next block is of the coexclusive type; and
   adding the target block to the blockchain as the next block in response to that the target block passes the consensus check.

3. The method according to claim 2, wherein the target block is related to a target service, and is used for storing the cross-chain service data of the target service; the performing consensus check on the target block according to consensus rules for the coexclusive type comprises:
   checking whether the target service is the independent cross-chain service; and
   determining that the target block passes the consensus check in response to that the target service is the independent cross-chain service.

4. The method according to claim 2, wherein the target block is related to target service, and the target block stores identifiers of multiple service parties participating in the target service; the on-chaining indication information further indicates identifiers of multiple coexclusive parties of the next block; the performing consensus check on the target block according to consensus rules for the coexclusive type comprises:
   checking whether the identifiers of the multiple service parties in the target block are the same as the identifiers of the multiple coexclusive parties of the next block; and
   determining that the target block passes the consensus check in response to that the identifiers of the multiple service parties in the target block are the same as the identifiers of the multiple coexclusive parties of the next block.

5. The method according to claim 4, wherein the target block further stores service data to be deposited of the multiple service parties; the on-chaining indication information further indicates occupation amounts of the multiple coexclusive parties; after checking that the identifiers of the multiple service parties in the target block are the same as the identifiers of the multiple coexclusive parties of the next block, the method further comprises:
   obtaining an amount of service data to be deposited of a service party of the multiple service parties in the target block;
   checking whether the amount of the service data to be deposited of the service party matches an occupation amount of a corresponding coexclusive party in the multiple coexclusive parties; and
   determining whether the target block passes the consensus check in response to that the amount of the service data to be deposited of the service party matches the occupation amount of the corresponding coexclusive party.

6. The method according to claim 2, wherein the target block is related to a target service, the target service is participated by multiple service parties, and one of the multiple service parties refers to one consensus cluster in the consensus subnet; the target block further stores service data to be deposited of the multiple service parties; and a service party maintains a blockchain sub-chain;

the performing consensus check on the target block according to consensus rules for the coexclusive type comprises: for a service party in the multiple service parties:

checking whether the service data to be deposited of the service party in the target block is stored in the blockchain sub-chain of the service party; and determining that the target block passes the consensus check in response to that the service data to be deposited of the service party in the target block is stored in the blockchain sub-chain of the service party.

7. The method according to claim 1, wherein the obtaining the bidding result information of the next block comprises:

receiving the bidding information for the next block, submitted by the second representative node, during reaching a consensus on a block at an end position of the blockchain, the bidding information being used for requesting the proposal right of the next block;

performing consensus check on the bidding information; and receiving the bidding result information broadcast by the consensus committee.

8. The method according to claim 1, wherein in response to that the first representative node and the second representative node are the same representative node, the obtaining the bidding result information of the next block comprises:

submitting the bidding information for the next block to the consensus committee during reaching a consensus on a block at an end position of the blockchain, the bidding information being used for requesting the proposal right of the next block;

performing consensus check on the bidding information; and receiving the bidding result information broadcast by the consensus committee.

9. The method according to claim 1, wherein the generating the on-chaining indication information of the next block according to the bidding result information comprises:

extracting the bidding information from the bidding result information; and generating the on-chaining indication information of the next block according to the extracted bidding information.

10. The method according to claim 1, wherein the bidding information comprises at least one of the amount of service data to be packed in the next block, the identifiers of service parties related to the service data, and the type of the service data.

11. The method according to claim 1, wherein the waiting time is negatively correlated with the amount of bidding resources; and the bidding information is obtained at least by performing weighted calculation according to the waiting time and the amount of bidding resources.

12. The method according to claim 11, wherein the bidding information is obtained by performing weighted calculation according to the waiting time, the amount of bidding resources and a weight corresponding to service priority.

13. The method according to claim 1, wherein the bidding resources corresponding to the amount of bidding resources comprise at least one of physical resources, virtual goods or the amount of service data to be deposited.

14. The method according to claim 1, wherein the target block is related to a target service, and the target service is participated by multiple service parties; and in response to that the first representative node and the second representative node are the same representative node, the method further comprises:

obtaining cross-chain service data of the multiple service parties of the target service from a resource pool in the blockchain network, and generating the target block according to the cross-chain service data of the multiple service parties.

15. A data processing apparatus based on a blockchain, wherein the blockchain comprises at least one block and is located in a blockchain network comprising a witness subnet and a consensus subnet, the witness subnet contains at least one service node, and the consensus subnet contains at least two consensus clusters; a consensus cluster comprises multiple accounting nodes, and one accounting node is elected in its own consensus cluster as a representative node; representative nodes of the at least two consensus clusters form a consensus committee of the blockchain; the data processing apparatus is carried in a first representative node of the representative nodes in the consensus committee; and the data processing apparatus comprises:

a non-transitory computer-readable storage medium storing computer readable instructions; and one or more processors, configured to execute the computer-readable instructions and perform:

obtaining bidding result information of a next block to be on-chained, the bidding result information indicating a second representative node having a proposal right of the next block and bidding information for the next block submitted by the second representative node; and generating on-chaining indication information of the next block of the blockchain according to the bidding result information, the on-chaining indication information indicating a type of a next block to be on-chained;

obtaining a target block waiting for consensus in the blockchain network, the target block being generated according to cross-chain service data; and adding the target block to the blockchain as the next block in response to that the on-chaining indication information indicates that the next block is of a coexclusive type, wherein a block of the coexclusive type is configured to store data of an independent cross-chain service, wherein:

the bidding information comprises waiting time and an amount of bidding resources, the waiting time being a duration waited by the second representative node from a time of requesting the proposal right to a time of obtaining the proposal right; and the bidding result information is generated after the consensus committee performs consensus check on the bidding information based on the waiting time and the amount of bidding resources in the bidding information, and the consensus check of the bidding information is successful.

16. The apparatus according to claim 15, wherein the adding the target block to the blockchain as the next block in response to that the on-chaining indication information indicates that the next block is of a coexclusive type comprises:

performing consensus check on the target block according to consensus rules for the coexclusive type in response to that the on-chaining indication information indicates that the next block is of the coexclusive type; and adding the target block to the blockchain as the next block in response to that the target block passes the consensus check.

17. The apparatus according to claim 16, wherein the target block is related to a target service, and is used for storing the cross-chain service data of the target service; the performing consensus check on the target block according to consensus rules for the coexclusive type comprises:

checking whether the target service is the independent cross-chain service; and determining that the target block passes the consensus check in response to that the target service is the independent cross-chain service.

18. A non-transitory computer-readable storage medium storing computer-readable instructions, wherein the computer-readable instructions, when being loaded by at least one processor of a first representative node of representative nodes in a consensus committee of a blockchain, causing the at least one processor to perform:

obtaining bidding result information of a next block to be on-chained, the bidding result information indicating a second representative node having a proposal right of the next block and bidding information for the next block submitted by the second representative node; and generating on-chaining indication information of the next block of the blockchain according to the bidding result information, the on-chaining indication information indicating a type of a next block to be on-chained;

obtaining a target block waiting for consensus in the blockchain network, the target block being generated according to cross-chain service data; and adding the target block to the blockchain as the next block in response to that the on-chaining indication information indicates that the next block is of a coexclusive type, wherein a block of the coexclusive type is configured to store data of an independent cross-chain service, wherein:

the bidding information comprises waiting time and an amount of bidding resources, the waiting time being a duration waited by the second representative node from a time of requesting the proposal right to a time of obtaining the proposal right; and the bidding result information is generated after the consensus committee performs consensus check on the bidding information based on the waiting time and the amount of bidding resources in the bidding information, and the consensus check of the bidding information is successful.

* * * * *